United States Patent [19]
Terada et al.

[11] Patent Number: 6,121,815
[45] Date of Patent: Sep. 19, 2000

[54] SEMICONDUCTOR INTEGRATED CIRCUIT, SYSTEM, AND METHOD FOR REDUCING A SKEW BETWEEN A CLOCK SIGNAL AND A DATA SIGNAL

[75] Inventors: Yutaka Terada; Hironori Akamatsu, both of Hirakata, Japan

[73] Assignee: Matsushita Electric Industrial Co., Ltd., Osaka, Japan

[21] Appl. No.: 09/066,234

[22] Filed: Apr. 24, 1998

[30] Foreign Application Priority Data

Apr. 25, 1997 [JP] Japan .................................. 9-108807

[51] Int. Cl.[7] .................................................. G06F 1/04
[52] U.S. Cl. .......................................... 327/292; 327/141
[58] Field of Search ..................... 327/141, 154, 327/161, 162, 163, 165, 233, 236, 261, 269, 270, 292, 299; 375/354, 362, 365, 368, 371, 372, 373, 375

[56] References Cited

U.S. PATENT DOCUMENTS

| | | | |
|---|---|---|---|
| 3,908,084 | 9/1975 | Wiley | 178/69.5 R |
| 5,022,056 | 6/1991 | Henderson et al. | 375/119 |
| 5,111,086 | 5/1992 | Back | 307/603 |
| 5,446,766 | 8/1995 | Wray | 375/373 |
| 5,636,165 | 6/1997 | Amatangelo et al. | 327/194 |
| 5,748,018 | 5/1998 | Ishikawa | 327/154 |
| 5,822,386 | 10/1998 | Pawelski | 375/373 |
| 5,887,040 | 3/1999 | Jung et al. | 375/372 |
| 5,905,391 | 5/1999 | Mooney | 327/161 |

*Primary Examiner*—Jeffrey Zweizig
*Attorney, Agent, or Firm*—Renner, Otto, Boisselle & Sklar LLP

[57] ABSTRACT

A semiconductor integrated circuit includes: a phase difference reduction circuit for reducing a first phase difference between a clock signal and a data signal; and a circuit for receiving the data signal with a reduced first phase difference between the clock signal and the data signal.

9 Claims, 24 Drawing Sheets

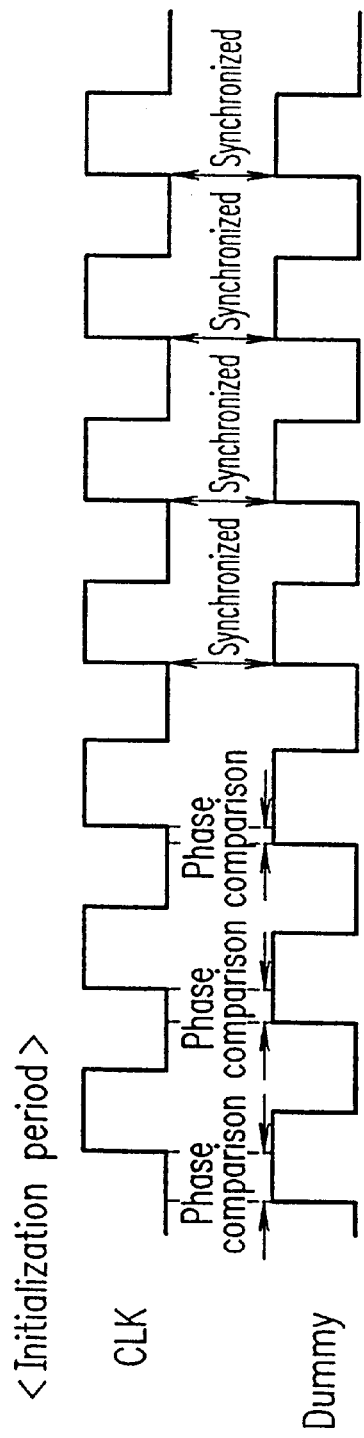
FIG. 4A  <Initialization period>
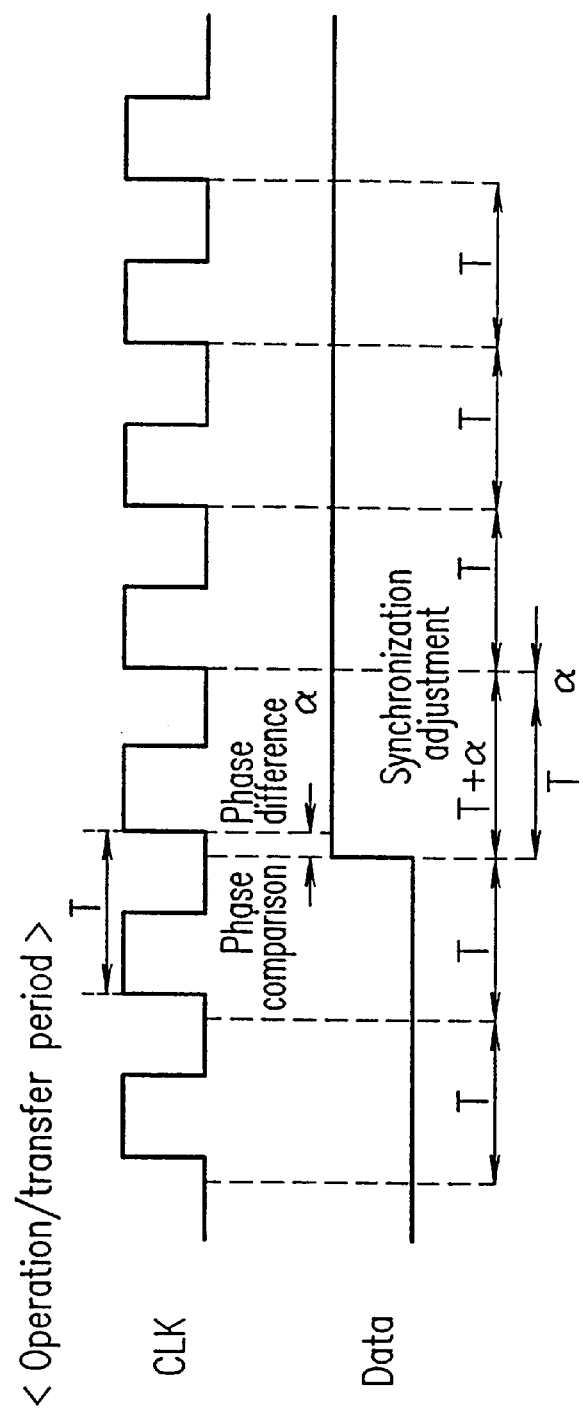
FIG. 4B  <Operation/transfer period>

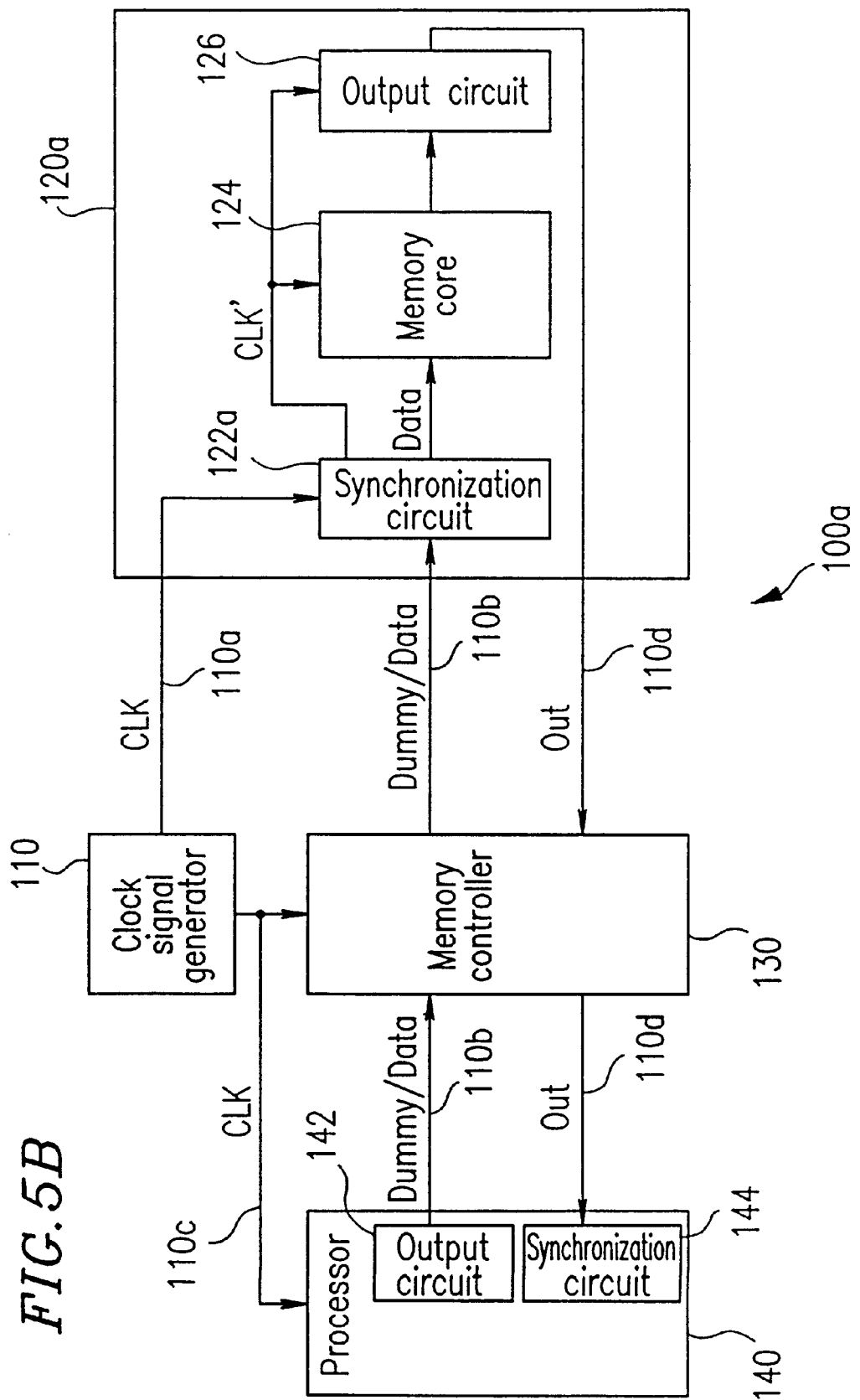

⟨Operation/transfer period⟩

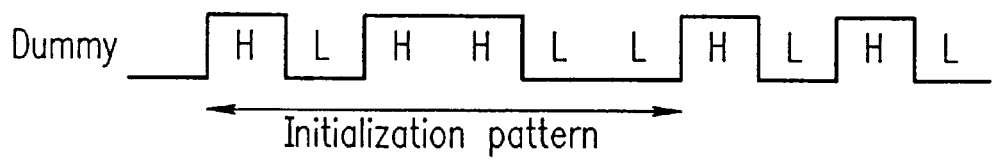

6,121,815

SEMICONDUCTOR INTEGRATED CIRCUIT, SYSTEM, AND METHOD FOR REDUCING A SKEW BETWEEN A CLOCK SIGNAL AND A DATA SIGNAL

BACKGROUND OF THE INVENTION

1. Field of the Invention

The present invention relates to a semiconductor integrated circuit and a system capable of reducing a difference between the phase of a clock signal and the phase of a data signal, and a method for reducing a skew between a clock signal and a data signal.

2. Description of the Related Art

The prevalence of multimedia applications has demanded enhancement in the operating speed of systems, such as those based on personal computers. Since semiconductor devices play a major role in such enhancement, there has been a long-standing need for increasing the operating speed of semiconductor devices.

In a system including a plurality of semiconductor devices, transfers of signals between devices are required. In order to perform a rapid transfer, recent transfer methods feature a synchronization system, i.e., a clock signal is provided whose level repetitively undergoes transitions In predetermined periods,. so that other signals are synchronized with the clock signal.

FIG. 23A illustrates a conventional synchronization system. A buffer 703*a* formed on a chip 705 outputs a data signal Data. A buffer 703*b* formed on a chip 704 receives the date signal Data and outputs it to a holding circuit 701. The holding circuit 701 holds the data signal Data in synchronization with a reference clock signal SysCLK and transfers the data signal Data to an internal circuit 702.

One common method for attaining a higher speed operation in such a synchronization system is increasing the frequency of a reference clock signal. However, there may be a discrepancy or difference in timing between the reference clock signal and another signal (e.g., a data signal). Such a difference in timing is referred to as a skew. A skew may cause an operation failure of the holding circuit.

FIG. 23B describes a mislatching problem due to a shift (hereinafter referred to as a "phase shift") of the phase of a reference clock signal SysCLK relative to the phase of a data signal Data (or vice versa) causing an operation failure of the holding circuit.

FIGS. 24A to 24C illustrate the reasons why a phase shift T becomes more problematic as the frequency of the reference clock signal increases although it is not problematic in the case where the reference clock signal has a sufficiently low frequency.

FIG. 24A illustrates the case where the reference clock signal SysCLK and the data signal completely match in phase.

FIG. 24B illustrates the case where the reference clock signal SysCLK and the data signal have a phase shift T in the case where the reference clock signal SysCLK has a low frequency. The phase shift T in this case is not particularly problematic because nonetheless correct data is being output.

FIG. 24C illustrates the case where the reference clock signal SysCLK and the data signal have a phase shift T in the case where the reference clock signal SysCLK has a high frequency. The phase shift T in this case becomes problematic because correct data is not being output.

Thus, a phase shift exerts a larger influence as each signal is driven faster; this poses an obstacle in realizing a high-speed operation of the overall system.

According to a conventionally employed method for minimizing a phase shift, it is ensured that the transfer path of a reference clock signal is disposed as close to the transfer path of a data signal as possible. However, this method has disadvantages including the limited layout of the signal wiring as well as incapability of accommodating phase shifts due to fluctuation in the supply power and/or fluctuation in temperature.

SUMMARY OF THE INVENTION

A semiconductor integrated circuit according to the present invention includes: a phase difference reduction circuit for reducing a first phase difference between a clock signal and a data signal; and a circuit for receiving the data signal with a reduced first phase difference between the clock signal and the data signal.

In one embodiment of the invention, the phase difference reduction circuit includes: a delay amount determination circuit for determining a first delay amount for reducing a second phase difference between the clock signal and a dummy pattern signal; and a variable delay circuit for delaying one of the clock signal and the data signal in accordance with the first delay amount.

In another embodiment of the invention, the delay amount determination circuit further determines a second delay amount for reducing the first phase difference between the clock signal and the data signal, and the variable delay circuit delays one of the clock signal and the data signal in accordance with the second delay amount.

In still another embodiment of the invention, the dummy pattern signal is a signal which undergoes at least one transition from a first logic level to a second logic level.

In still another embodiment of the invention, the data signal is input to the phase difference reduction circuit via a data line, and the dummy pattern signal is input to the phase difference reduction circuit via the data line before the data signal is input to the phase difference reduction circuit.

A system according to the present invention includes a first semiconductor integrated circuit and a second semiconductor integrated circuit, wherein the first semiconductor integrated circuit includes an output circuit for outputting a data signal to the second semiconductor integrated circuit, and the second semiconductor integrated circuit includes: a phase difference reduction circuit for receiving the data signal output from the first semiconductor integrated circuit and reducing a first phase difference between a clock signal and the data signal; and a circuit for receiving the data signal with a reduced first phase difference between the clock signal and the data signal.

In one embodiment of the invention, the phase difference reduction circuit includes: a delay amount determination circuit for determining a first delay amount for reducing a second phase difference between the clock signal and a dummy pattern signal; and a variable delay circuit for delaying one of the clock signal and the data signal in accordance with the first delay amount.

In another embodiment of the invention, the delay amount determination circuit further determines a second delay amount for reducing the first phase difference between the clock signal and the data signal, and the variable delay circuit delays one of the clock signal and the data signal in accordance with the second delay amount.

In still another embodiment of the invention, the dummy pattern signal is a signal which undergoes at least one transition from a first logic level to a second logic level.

In still another embodiment of the invention, the first semiconductor integrated circuit and the second semiconductor integrated circuit are interconnected via a data line, and the data signal is transferred from the first semiconductor integrated circuit to the second semiconductor integrated circuit via the data line, the dummy pattern signal being transferred from the first semiconductor integrated circuit to the second semiconductor integrated circuit via the data line before the data signal is transferred from the first semiconductor integrated circuit to the second semiconductor integrated circuit.

A method for reducing a skew between a clock signal and a data signal according to the present invention includes the steps of: (a) reducing a first phase difference between the clock signal and the data signal; and (b) receiving the data signal with a reduced first phase difference between the clock signal and the data signal.

In one embodiment of the invention, step (a) includes the steps of: (a-1) determining a first delay amount for reducing a second phase difference between the clock signal and a dummy pattern signal; and (a-2) delaying one of the clock signal and the data signal in accordance with the first delay amount.

In one embodiment of the invention, step (a) further includes the steps of: (a-3) further determining a second delay amount for reducing the first phase difference between the clock signal and the data signal; and (a-4) delaying one of the clock signal and the data signal in accordance with the second delay amount.

In another embodiment of the invention, the dummy pattern signal is a signal which undergoes at least one transition from a first logic level to a second logic level.

A method for reducing a skew between a clock signal and a data signal in a semiconductor integrated circuit coupled to a data line according to the present invention includes the steps of: (a) receiving a dummy pattern signal via the data line during a first period; (b) receiving the data signal via the data line during a second period; (c) reducing a phase difference between the clock signal and the data signal based on a phase difference between the clock signal and the dummy pattern signal.

Thus, the invention described herein makes possible the advantages of: (1) providing a semiconductor integrated circuit and a system capable of reducing a difference in phase between a clock signal and a data signal; and (2) providing a method for reducing a skew between a clock signal and a data signal.

These and other advantages of the present invention will become apparent to those skilled in the art upon reading and understanding the following detailed description with reference to the accompanying figures.

BRIEF DESCRIPTION OF THE DRAWINGS

FIG. 4A is a timing diagram illustrating how a clock signal CLK and a dummy pattern signal Dummy are synchronized during an initialization period.

FIG. 4B is a timing diagram illustrating how a clock signal CLK and a data signal Data are synchronized during an operation/transfer period.

FIG. 5B is a block diagram illustrating an exemplary structure of a memory system 100a.

FIG. 8 is a block diagram illustrating an exemplary structure of a synchronization circuit 125a.

FIG. 20A is a timing diagram illustrating an exemplary initialization pattern.

FIG. 20B is a diagram illustrating how a clock signal CLK' and a dummy pattern signal Dummy are brought into matching phase.

FIG. 21A is a block diagram illustrating an exemplary structure of a PD reduction circuit 520a.

DESCRIPTION OF THE PREFERRED EMBODIMENTS

Hereinafter, examples of the present invention will be described with reference to the accompanying figures.

EXAMPLE 1

Figure 1:
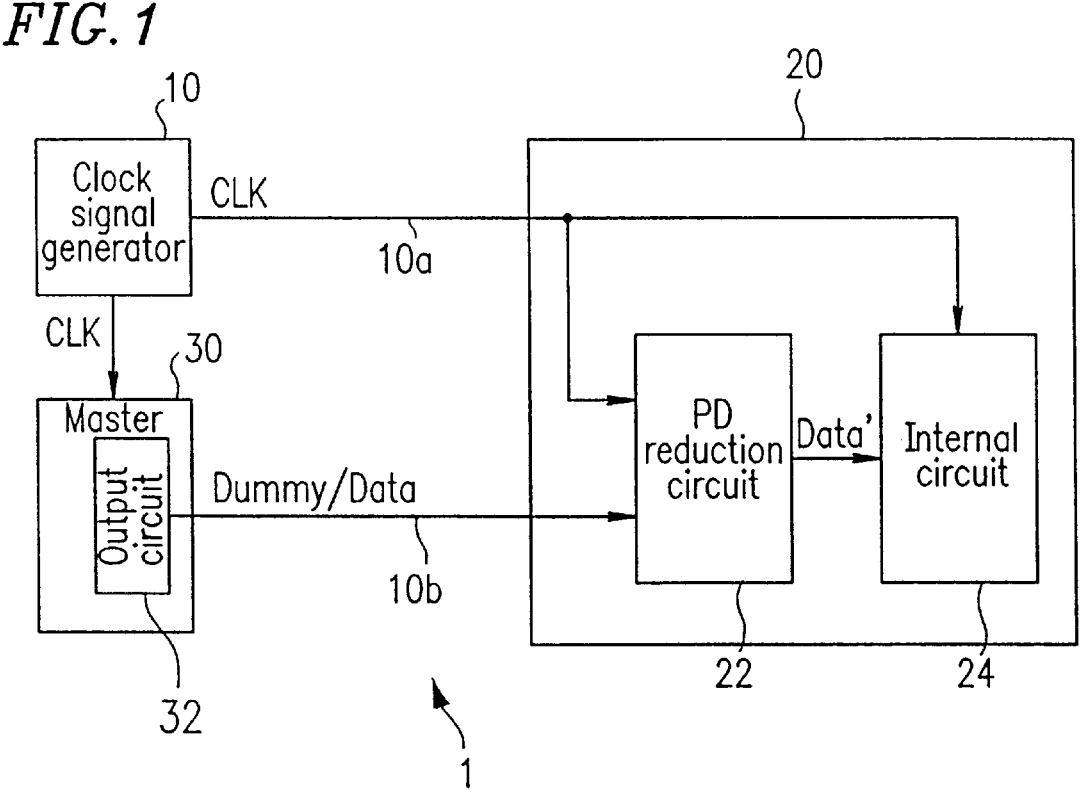
FIG. 1 is a block diagram illustrating an exemplary structure of a system 1 according to Example 1 of the present invention.

FIG. 1 illustrates an exemplary structure of a system 1 according to Example 1 of the present invention. The system 1 includes a clock signal generator 10 for generating a clock signal CLK, a slave 20 which operates in accordance with the clock signal CLK, and a master 30 which operates in accordance with the clock signal CLK and outputs a data signal Data to the slave 20. The master 30 and/or the slave 20 can be a semiconductor integrated circuit.

In the present specification, signals which are transferred between different circuits are generally called "data signals Data". The "data signal Data" includes any signal which is transferred between the master 30 and the slave 20.

The clock signal CLK is supplied to the slave 20 via a clock signal line 10a. The data signal Data is supplied to the slave 20 via a data signal line 10b. As a result of the clock signal CLK and the data signal Data being supplied to the slave 20 via such different paths, a skew (i.e., a difference between the phase of the clock signal CLK and the phase of the data signal Data) may occur between the clock signal CLK and the data signal Data. The level of skew may vary due to fluctuation in the supply power, fluctuation in temperature, process-associated fluctuation, and the like.

A phase difference reduction circuit (hereinafter "PD reduction circuit") 22 is provided in the slave 20 for reducing a skew which may occur for the aforementioned reasons. The PD reduction circuit 22 reduces the phase difference between the clock signal CLK and the data signal Data. Once its phase difference is reduced by the PD reduction circuit 22, the data signal Data is supplied to an internal circuit 24 as a data signal Data'. The internal circuit 24 receives and processes the date signal Data'. The internal circuit 24 can be any circuit for processing the data signal Data' as desired.

Preferably, the PD reduction circuit 22 substantially eliminates the phase difference between the clock signal CLK and the data signal Data (so that the phase difference between the clock signal CLK and the data signal Data becomes substantially zero). AS a result, a date signal Data' which is synchronized with the clock signal CLK can be obtained irrespective of the paths via which the clock signal CLK and the data signal Data are supplied.

The master 30 includes an output circuit 32 for selectively outputting either a dummy pattern signal Dummy or the date signal Data to a data signal line 10b. Specifically, the output circuit 32 outputs the dummy pattern signal Dummy to the data signal line 10b during an initialization period, and outputs the data signal Data to the date signal line 10b during an operation/transfer period. The signal initialization period precedes the operation/transfer period.

As a result, the dummy pattern signal Dummy is input to the slave 20 via the data signal line 10b during an initialization period; and the data signal Data is input to the slave 20 via the data signal line 10b during an operation/transfer period.

Herein, a "dummy pattern signal Dummy" is defined as a signal whose logic level undergoes at least one change during an initialization period. In other words, during an initialization period, the dummy pattern signal Dummy goes from a H (high) level to a L (low) level, or from the L level to the H level.

The dummy pattern signal Dummy is used for determining a delay amount corresponding to a phase difference. between the clock signal CLK and the data signal Data, as described later. In order to determine a delay amount as such, the dummy pattern signal Dummy must have at least one edge (i.e., a rising edge or a falling edge) during an initialization period because the delay amount must be determined at a value that causes an edge of the clock signal CLK to coincide with an edge of the dummy pattern signal Dummy. Preferably, the dummy pattern signal Dummy is a clock signal having the same cycle as that of the clock signal CLK.

Figure 2:
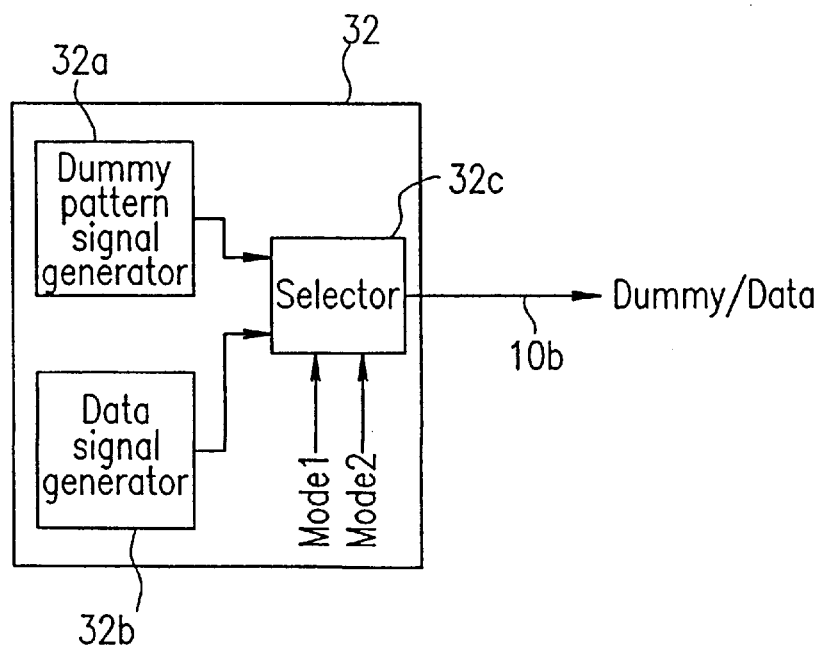
FIG. 2 is a block diagram illustrating an exemplary structure of an output circuit 32.

FIG. 2 illustrates an exemplary structure of the output circuit 32.

The output circuit 32 includes a dummy pattern signal generator 32a for generating the dummy pattern signal Dummy, a data signal generator 32b for generating the data signal Data, and a selector 32c for selecting either the output from the dummy pattern signal generator 32a or the output from the data signal generator 32b. The selector 32c selects the dummy pattern signal Dummy during an initialization period, so that the dummy pattern signal Dummy is output to the data signal line 10b. The selector 32c selects the data signal Data during an operation/transfer period, so that the data signal Data is output to the data signal line 10b.

The switching of the selector 32c occurs in accordance with a control signal Mode1 (defining an initialization period) or a control signal Mode2 (defining an operation/transfer period). These control signals can be generated internally within the output circuit 32 or generated externally to the output circuit 32.

In the case where a clock signal having the same cycle as that of the clock signal CLK is used as the dummy pattern signal Dummy, the dummy pattern signal generator 32a can be omitted. In this case, the clock signal CLK (supplied from the clock signal generator 10) can be arranged so as to be input to the selector 32c.

Figure 3:
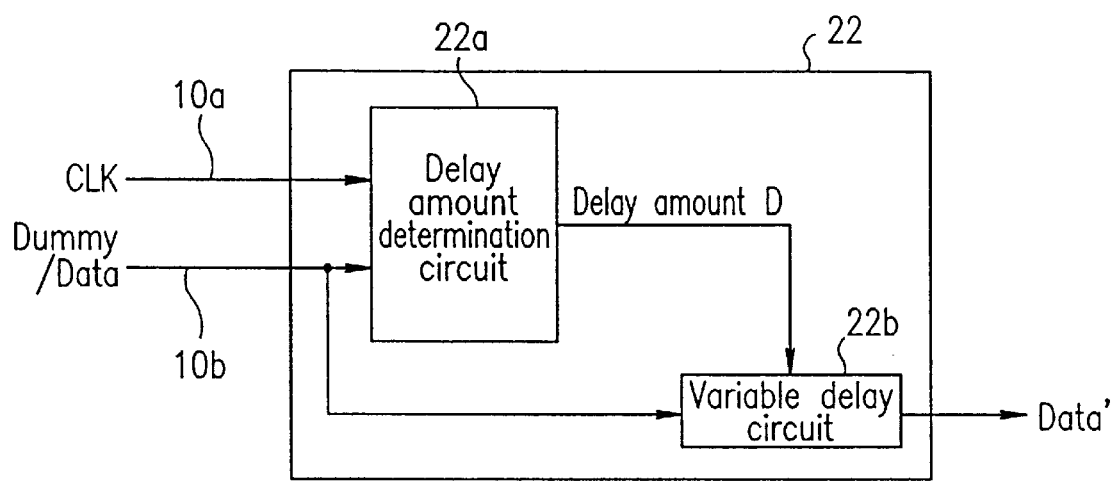
FIG. 3 is a block diagram illustrating an exemplary structure of a phase difference reduction circuit 22 according to Example 1 of the present invention.

FIG. 3 illustrates an exemplary structure of the PD reduction circuit 22.

The PD reduction circuit 22 includes a delay amount determination circuit 22a for determining a delay amount so that the phase difference between the clock signal CLK and the dummy pattern signal Dummy can be reduced, and a variable delay circuit 22b having an adjustable delay amount D. For example, in the case where the variable delay circuit 22b includes a plurality of serially-connected delay elements, the variable delay circuit 22b can be arranged so as to allow a signal to be passed through a variable number of delay elements (among the plurality of delay elements) in accordance with the desired delay amount D, thereby making it possible to set a desired delay amount in the variable delay circuit 22b.

During an initialization period, the delay amount determination circuit 22a determines the delay amount D. The delay amount is determined so that the phase difference between the clock signal CLK and the dummy pattern signal Dummy is reduced. For example, an edge of the clock signal CLK can be compared against an edge of the dummy pattern signal Dummy so that a delay amount D can be determined which causes these edges to coincide. The delay amount D determined by the delay amount determination circuit 22a is set in the variable delay circuit 22b.

During an operation/transfer period, the date signal Data is delayed by the delay amount D (which is set in the variable delay circuit 22b during the initialization period). The PD reduction circuit 22 outputs the delayed data signal Data to the internal circuit 24 as the data signal Data'. The internal circuit 24 operates in accordance with the clock signal CLK. For example, the internal circuit 24 can fetch the data signal Data' in response to an edge of the clock signal CLK. Thus, the phase difference between the clock signal CLK and the data signal Data' can be reduced as compared with the phase difference between the clock signal CLK and the data signal Data.

Similar effects can be attained by delaying the clock signal CLK, instead of the data signal Data, by the delay amount D. In this case, the PD reduction circuit 22 outputs the data signal Data to the internal circuit 24, and outputs the delayed clock signal CLK to the internal circuit 24 as a clock signal CLK'. The internal circuit 24 operates in accordance with the clock signal CLK'. For example, the internal circuit 24 can fetch the data signal Data In response to an edge of the clock signal CLK'. Thus, the phase difference between the clock signal CLK' and the data signal Data can be reduced as compared with the phase difference between the clock signal CLK and the data signal Data. When the clock signal CLK is thus delayed by the delay amount D, it is unnecessary to supply the clock signal CLK to the internal circuit 24.

Thus, the phase difference between the clock signal CLK and the data signal Data can be reduced by setting an appropriate delay amount D in the variable delay circuit 22b before transferring the data signal Data from the master 30 to the slave 20. The reason behind this is that, since the data signal Data and the dummy pattern signal Dummy are transferred from the master 30 to the slave 20 via the same ,data signal line 10b, the phase difference between the clock signal CLK and the data signal Data is substantially equal to the phase difference between the clock signal CLK and the dummy pattern signal Dummy.

Preferably, the delay amount D is determined so that the phase difference bet ween the clock signal CLK and the dummy pattern signal Dummy becomes substantially zero. In this case, the phase difference between the clock signal CLK and the data signal Data can be made substantially zero.

However, in certain cases, the phase difference between the clock signal CLK and the data signal Data may not become substantially zero during the operation/transfer period even by substantially eliminating the phase difference between the clock signal CLK and the dummy pattern signal Dummy during an initialization period. Therefore, it is preferable to determine a delay amount D' during an operation/transfer period such that the phase difference between the clock signal CLK and the data signal Data is reduced, the delay amount D' being set in the variable delay circuit 22b during the operation/transfer period. In order to determine such a delay amount D', the data signal Data must have at least one edge (i.e., a rising edge or a falling edge) during an operation/transfer period because the delay amount D' must be determined so that an edge of the clock signal CLK coincides with an edge of the data signal Data. The data signal Data which has been delayed by the delay amount D' is output from the PD reduction circuit 22 as a data signal Data'. Thus, the phase difference between the clock signal CLK and the data signal Data' can be reduced as compared with the phase difference between the clock signal CLK and the data signal Data. Similar effects can be attained by delaying the clock signal CLK, instead of the data signal Data, by the delay amount D'.

FIG. 4A is a diagram illustrating how the clock signal CLK and the dummy pattern signal Dummy are synchronized during an initialization period. In the illustrated example, the dummy pattern signal Dummy is a clock signal having the same cycle as that of the clock signal CLK. As seen from FIG. 4A, the rising edge of the clock signal CLK does not coincide with the rising edge of the dummy pattern signal Dummy in the first cycle of the initialization period, whereas the rising edge of the clock signal CLK gradually begins to coincide with the rising edge of the dummy pattern signal Dummy in the subsequent cycles of the initialization period.

The edges used for synchronizing the clock signal CLK with the dummy pattern signal Dummy are not limited to rising edges. Rising edges, falling edges, or both of rising edges and falling edges can be used for synchronizing the clock signal CLK with the dummy pattern signal Dummy.

FIG. 4B is a diagram illustrating how a clock signal CLK and a data signal Data are synchronized during an operation/transfer period. If a phase shift α is detected between the clock signal CLK and the data is signal Data, the phase shift α is adjusted in a cycle following the cycle in which it was detected.

According to the present invention, the phase shift between the clock signal and the date signal can be minimized even in the case where the transfer path for the clock signal and the transfer path for the data signal are not disposed in proximity of each other. Also according to the present invention, it is possible to accommodate a phase shift due to fluctuation in the supply power and/or fluctuation in temperature, which cannot be accommodated by the conventional method of disposing the transfer path for the clock signal and the transfer path for the data signal in proximity of each other.

It is nonetheless preferable under the present invention that the transfer path for the clock signal and the transfer path for the data signal are disposed in proximity of each other in order to minimize the phase shift due to a difference in length between the transfer paths.

Hereinafter, an application example of the present invention in the form of a memory system will be described.

Figure 5A:
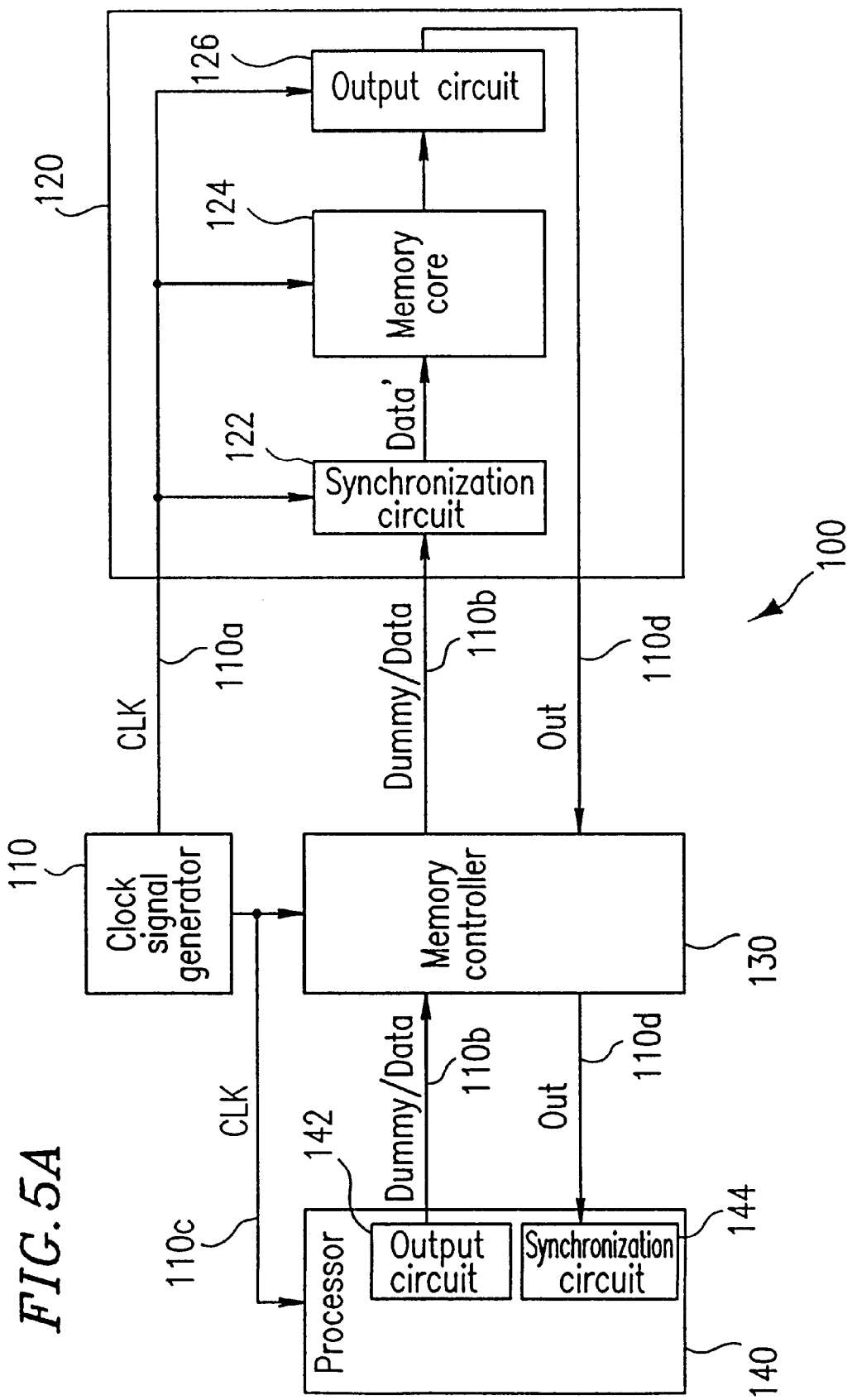
FIG. 5A is a block diagram illustrating an exemplary structure of a memory system 100.

FIG. 5A illustrates an exemplary structure of a memory system 100. The memory system 100 includes a clock signal generator 110 for generating a clock signal CLK, a memory 120 which operates in accordance with the clock signal CLK, a memory controller 130 which operates in accordance with the clock signal CLK, and a processor 140 which operates in accordance with the clock signal CLK. The clock signal generator 110, the memory 120, the memory controller 130, and the processor 140 can be formed on a single semiconductor chip, or alternatively on separate semiconductor chips.

The processor 140 includes an output circuit 142 for selectively outputting either a dummy pattern signal Dummy or a data signal Data to a data signal line 110b, and a synchronization circuit 144 for receiving an output signal Out from the memory 120 via a data signal line 110d and achieving synchronization between the clock signal CLK and the output signal Out. The output circuit 142 and the synchronization circuit 144 each operate in accordance with the clock signal CLK.

Herein, the data signal Data includes a control signal, an address signal, and a signal representing data to be written to the memory 120. The control signal can be, for example, a RAS signal, a CAS signal, a read/write control signal, or the like.

The dummy pattern signal Dummy and the data signal Data are transferred to the memory 120 via the memory controller 130. The output signal Out is transferred to the processor 140 via the memory controller 130.

The memory 120 includes a synchronization circuit 122 for achieving synchronization between the clock signal CLK and the data signal Data, a memory core 124, and an output circuit 126 for selectively outputting either the dummy pattern signal Dummy or the output signal out to the data signal line 110d. The synchronization circuit 122 and the output circuit 126 receive the clock signal CLK.

The memory core 124 includes a plurality of memory cells (not shown) and periphery circuitry (not shown) for accessing the memory cells. The peripheral circuitry includes, for example, a data latch, an address latch, a decoder, a sense amplifier, and the like. The memory core 124 is typically a synchronization-type memory (e.g., SDRAM) which operates in synchronization with the clock signal CLK, but is not limited to such synchronization-type memories. The memory core 124 can be of a type which does not synchronize with the clock signal CLK, in that case, it would be unnecessary to supply the clock signal CLK to the memory ore 124.

The clock signal CLK is supplied to the memory 120 via a clock signal line 110a. The data signal Data is supplied to the memory 120 via the data signal line 110b. Thus, the clock signal CLK and the data signal Data are supplied to the memory 120 via such different paths. The synchronization circuit 122 in the memory 120 is provided for reducing a skew which may occur between the clock signal CLK and the data signal Data. In other words, the synchronization circuit 122 performs the same function as that of the PD reduction circuit 22 shown. in FIG. 1.

The clock signal CLK is supplied to the processor 140 via the clock signal line 110c. The output signal Out is supplied to the processor 140 via the data signal line 110d. Thus, the clock signal CLK and the output signal Out are supplied to the processor 140 via such different paths. The synchronization circuit 144 in the processor 140 is provided for reducing a skew which may occur between the clock signal CLK and the output signal Out. In other words, the synchronization circuit 144 performs the same function as that of the PD reduction circuit 22 shown in FIG. 1.

Figure 6:
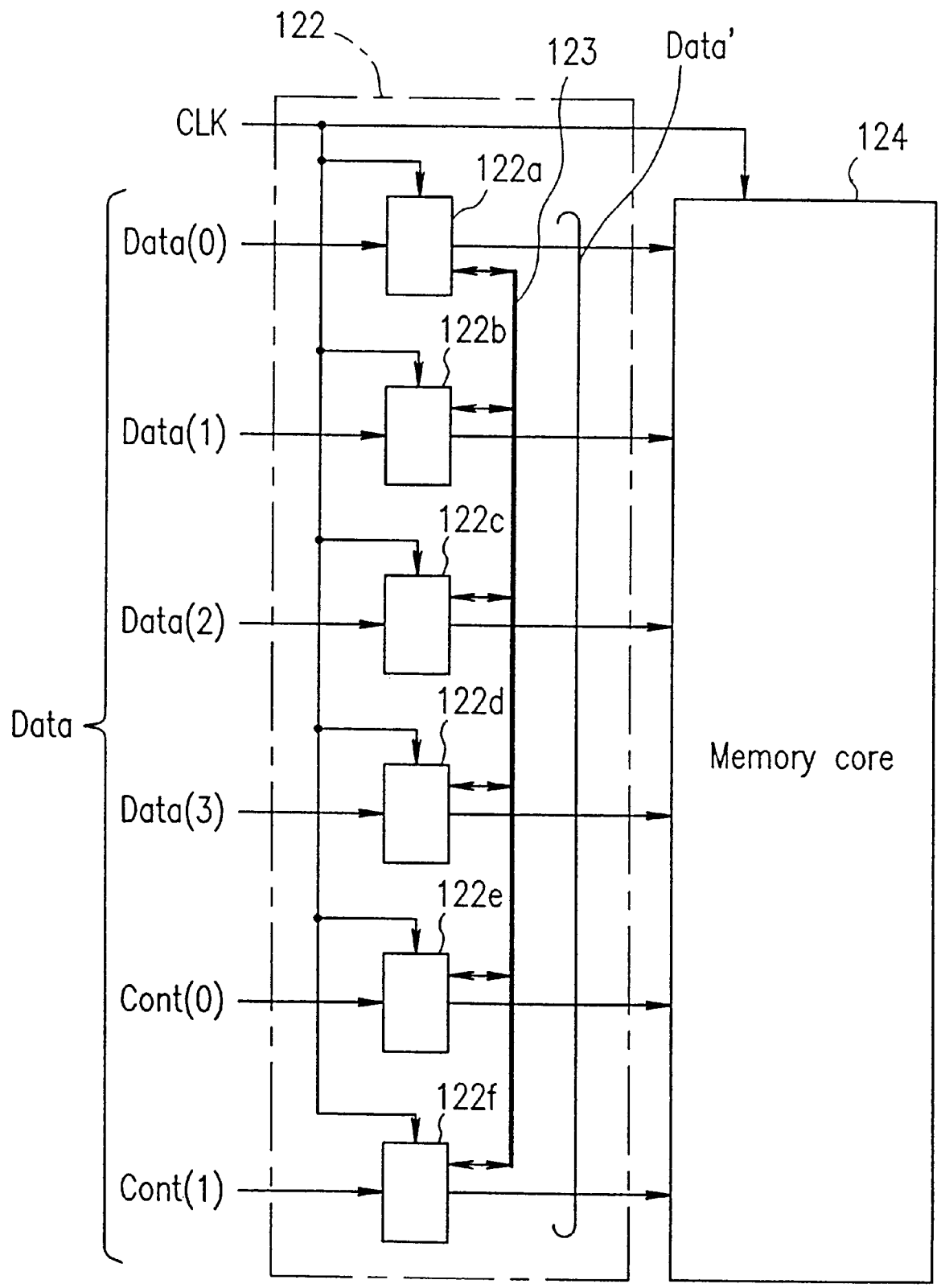
FIG. 6 is a block diagram illustrating an exemplary structure of a synchronization circuit 122.

FIG. 6 illustrates an exemplary structure of the synchronization circuit 122. The synchronization circuit 144 also has a similar structure.

In the exemplary structure shown in FIG. 6, the data signal Data has a 4-bit data signal section containing four 1-bit data signals (Data (0), Data (1), Data (2), Data (3)) and a 2-bit control signal section containing two 1-bit control signals (Cont (0), Cont (1)). The control signals of the 2-bit control signal section are, for example, read/write control signals or chip enable signals. It will be appreciated that the number of bits of the data signal and the number of bits of the control signals are not limited to the values exemplified in FIG. 6.

The synchronization circuit 122 includes as many synchronization circuits 122a to 122f as the number of buts of the data signal Data, so that synchronization with the clock signal CLK can be achieved for each 1-bit signal.

The synchronization circuit 122a receives the 1-bit data signal Data(0) and the clock signal CLK. The synchronization circuit 122a compares the phase of the data signal Data(0) against that of the clock signal CLK so as to determine a delay amount for the data signal Data(0) that substantially eliminates the phase difference (i.e., so that the phase difference becomes substantially zero). As a result, it can be ensured that an edge of the data signal Data(0) coincides with an edge of the clock signal CLK.

The synchronization circuits 122b to 122f have the same structure as that of the synchronization circuit 122a.

The synchronization circuits 122a to 122f are each coupled to an input/output line 123. The input/output line 123 is used for transmitting a delay amount which is determined in response to a transition in the level of a signal received by one of the synchronization circuits 122a to 122f to the other synchronization circuits. For example, the level of the data signal Data(0) may undergo a transition (from the L level to the H level, or vice versa). In this case, the delay amount can be determined so that an edge of the data signal Data(0) coincides with an edge of the clock signal CLK. The delay amount thus determined is transmitted to the other synchronization circuits 122b to 122f.

Thus, it is possible to achieve synchronization between a data signal whose level has not changed and the clock signal CLK. Such an operation is especially effective for the synchronization operation of the synchronization circuit 122 during an operation/transfer period because, unlike the clock signal CLK (which can be used as a dummy pattern signal Dummy), the data signal Data may not necessarily undergo a transition in level during a given period.

Hereinafter, referring back to FIG. 5A, the operation of the memory system 100 for writing data to the memory 120 will be described.

The processor 140 outputs to the memory controller 130 a control signal, an address signal, and a signal representing data to be written to the memory 120. The control signal can be, for example, a RAS signal, a CAS signal, a read/write control signal, or the like.

The memory controller 130 receives an address signal from the processor 140 and converts the address signal. The converted address signal is output to the memory 120. The memory controller 130 receives the control signal and the signal representing data to be written to the memory 120 from the processor 140, and outputs these received signals to the memory 120 without converting them.

During an initialization period, the output circuit 142 in the processor 140 outputs the dummy pattern signal Dummy to the data signal line 110b. The dummy pattern signal Dummy is transferred to the memory 120 via the memory controller 130. The dummy pattern signal Dummy is, for example, a pulse signal having the same cycle as that of the clock signal CLK. The synchronization circuit 122 in the memory 120 detects an edge of the clock signal CLK and an edge of the dummy pattern signal Dummy, and determines a delay amount so that these edges coincide.

During an operation/transfer period, the output circuit 142 in the processor 140 outputs the data signal Data to the data signal line 110b. The data signal Data Includes a control signal, an address signal, and a signal representing data to be written to the memory 120. The data signal Data is transferred to the memory 120 via the memory controller 130.

During an operation/transfer period, the operation of the memory 120 may cause fluctuation in the supply power and/or fluctuation in temperature. Such fluctuation may result in the clock signal CLK and the data signal Data being unsynchronized despite the delay amount which has been set during the initialization period. The synchronization circuit 122 in the memory 120 detects an edge of the clock signal CLK and an edge of the data signal Data and resets a delay amount so that these edges coincide. As a result, a data signal Data' which is synchronized with the clock signal CLK can be obtained. The data signal Data' is output to the memory core 124. Thus, the data signal Data', which is synchronized with the clock signal CLK, is written to the memory 120.

Thus, the synchronization circuit 122 can perform a synchronization function during an operation/transfer period, as well as an initialization period, in order to enhance operational accuracy of the entire memory system 100; however, such a synchronization operation by the synchronization circuit 122 during an operation/transfer period is optional. If a sufficient operational accuracy of the entire memory system 100 is provided by a synchronization operation by the synchronization circuit 122 during an initialization period alone, it is unnecessary for the synchronization circuit 122 to perform a synchronization operation during an operation/transfer period.

Next, the operation of the memory system 100 for reading data from the memory 120 will be described.

The operations of the output circuit 126 and the synchronization circuit 144 are the same as those of the output circuit 142 and the synchronization circuit 122, respectively. A delay amount is set in the synchronization circuit 144 so that an edge of the clock signal CLK and an edge of the output signal out coincide.

In the case where the length of the data signal line 110*b* from the output circuit 142 to the synchronization circuit 122 is substantially equal to the length of the data signal line 110*d* from the output circuit 126 to the synchronization circuit 144, it is applicable to omit the process of obtaining a delay amount in the synchronization circuit 144 and set in the synchronization circuit 144 the same delay amount as the delay amount set in the synchronization circuit 122 because the skew between the clock signal CLK and the data signal Data and the skew between the clock signal CLK and the output signal Out can. be regarded as substantially equal where the data signal line 110*b* and the data signal line 110*d* have substantially equal lengths. This will help simplify the synchronization circuit 144.

FIG. 5B illustrates an exemplary structure of a memory system 100*a* in which synchronization between a data signal Data and a clock signal CLK is achieved by delaying the clock signal CLK instead of the data signal Data. In FIG. 5B, constituent elements which also appear in FIG. 5A are denoted by the same reference numerals as used therein, and the descriptions thereof are omitted.

A memory 120*a* includes a synchronization circuit 122*a*, a memory core 124, and an output circuit 126.

The synchronization circuit 122*a* achieves synchronization between the data signal Data and the clock signal CLK by de laying the clock signal CLK. The synchronization circuit 122*a* outputs the data signal Data to the memory core 124 and the delayed clock signal CLK to the memory core 124 as a clock signal CLK'. The memory core 124 receives the dates signal Data in synchronization with the clock signal CLK'. The output circuit 126 receives the clock signal CLK'.

Figure 7:
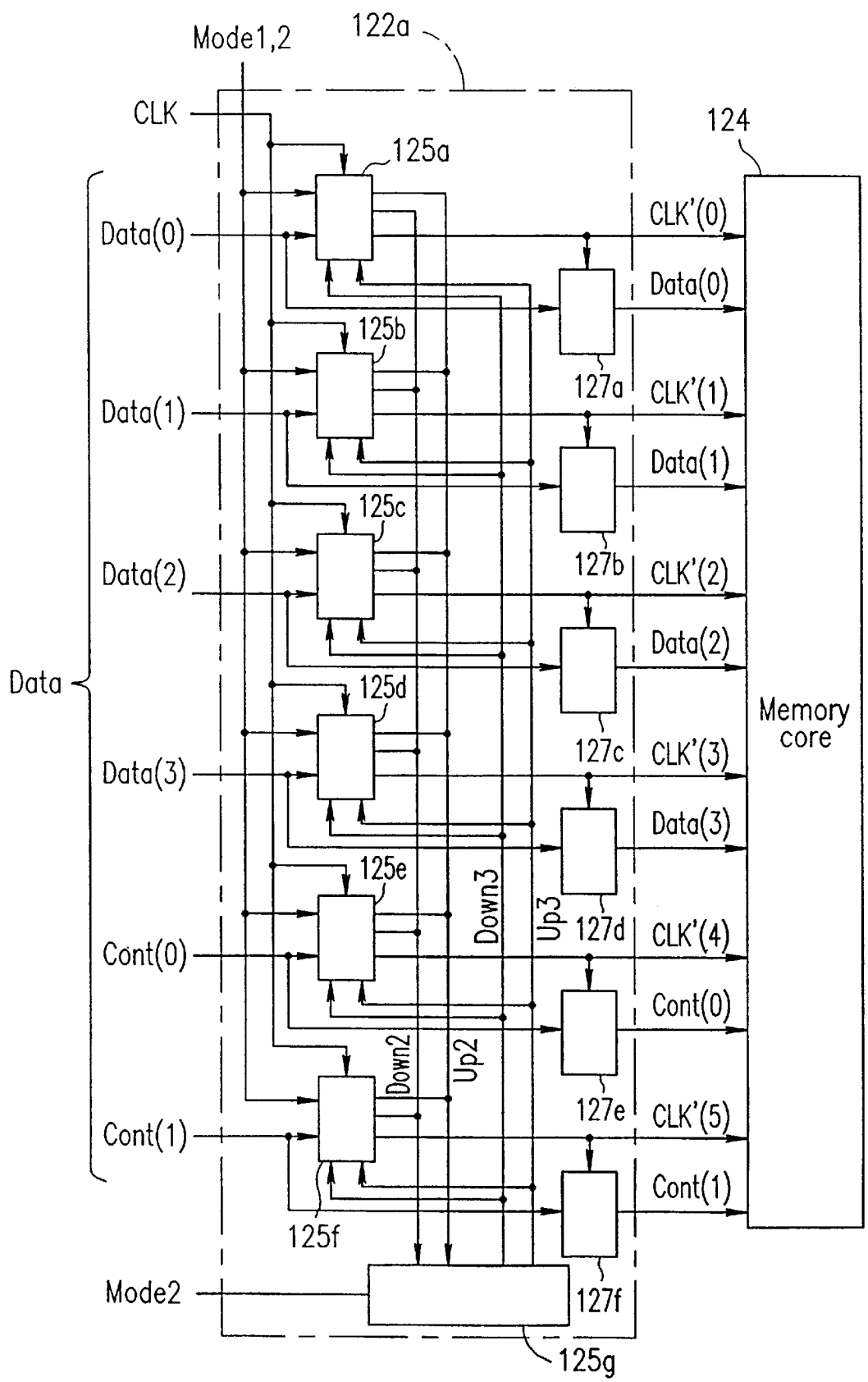
FIG. 7 is a block diagram illustrating another structure of the synchronization circuit 122.

FIG. 7 illustrates an exemplary structure of the synchronization circuit 122*a*. The synchronization circuit 122*a* includes synchronization circuits 125*a* to 125*f* for achieving synchronization between the clock signal CLK and the data signal Data, latch circuits 127*a* to 127*f*, and a holding circuit 125*g*.

The holding circuit 125*g* is used f or transmitting a delay amount which is determined in response to a transition in the level of a signal received by one of the synchronization circuits 122*a* to 122*f* to all of the synchronization circuits. The holding circuit 125*g* is activated in accordance with a control signal Mode 2.

Figure 8:
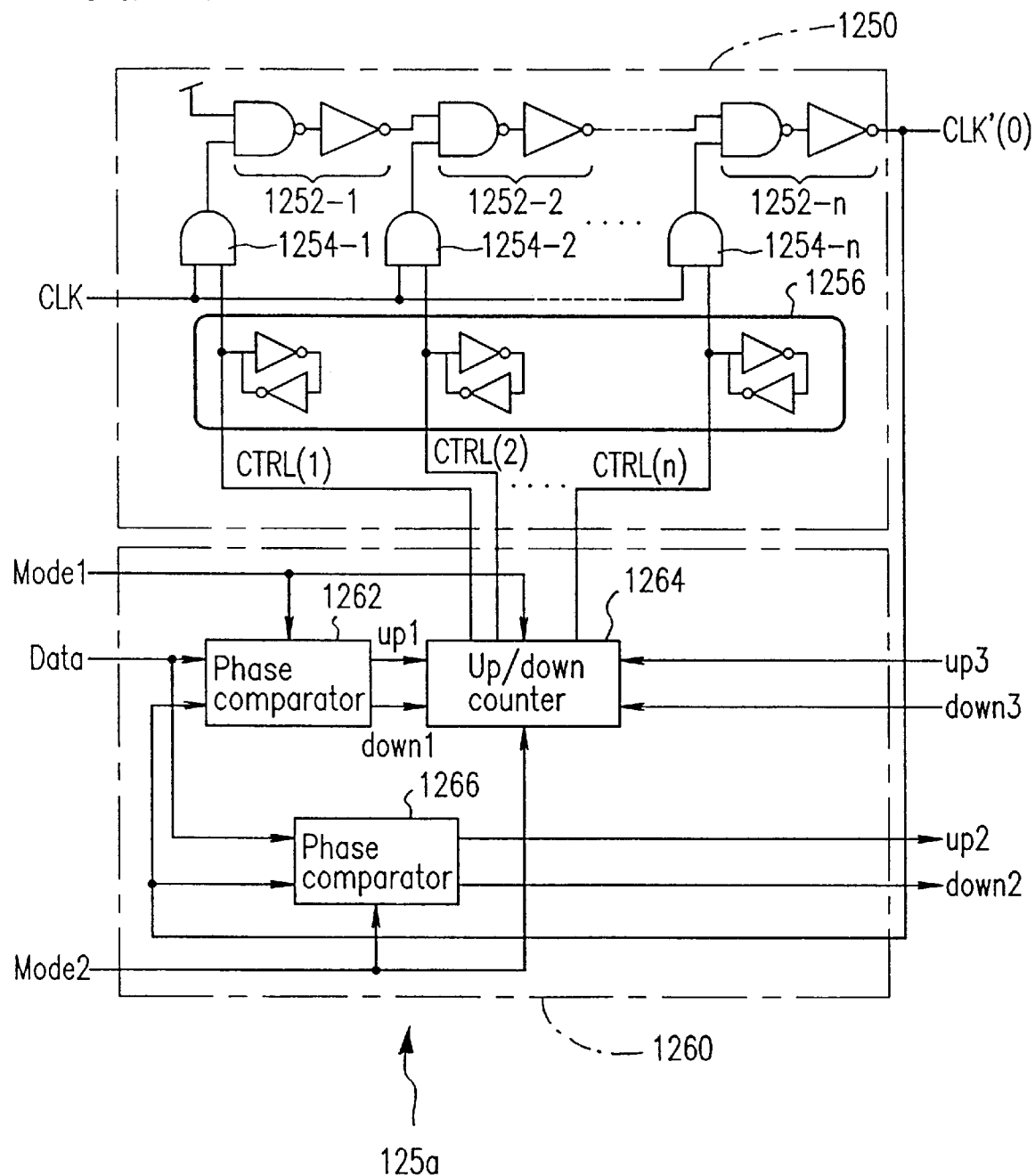

FIG. 8 illustrates an exemplary structure of the synchronization circuit 125*a*. The synchronization circuits 125*b* to 125*f* have the same structure as that of the synchronization circuit 125*a*.

The synchronization circuit 125*a* includes a delay amount determination circuit 1260 for determining a delay amount so that the phase difference between the clock signal CLK and the data signal Data is reduced, and a variable delay circuit 1250 for delaying the clock signal CLK in accordance with the delay amount. The synchronization circuit 125*a* is activated in accordance with the controls signals Mode 1 and Mode 2.

The variable delay circuit 1250 includes delay elements 1252-1 to 1252-n, AND elements 1254-1 to 1254-n, and a holding circuit 1256 (where n is an integer).

The holding circuit 1256 holds the levels of control signals CTRL(1) to CTRL(n) which are input to the holding circuit 1256. Only one of the control signals CTRL(1) to CTRL(n) is set at the H level. For example, assuming that the control signal CTRL(1) is at the H level and the control signals CTRL(2) to CTRL(n) are at the L level, the clock signal CLK is passed through the delay elements 1252-1 to 1252-n via the AND element 1254-1. Thus, by using the control signals CTRL(1) to CTRL(n), it is possible to control the number of delay elements which the clock signal CLK is passed through and thus the delay amount to be applied to the clock signal CLK. The clock signal CLK, which has been delayed in the variable delay circuit 1250, is output from the variable delay circuit 1250 as a clock signal CLK'(0).

The delay amount determination circuit 1260 receives the control signals Mode 1 and Mode 2. The control signal Mode 1 defines an initialization period. For example, the initialization period may be defined as a period during which the control signal Mode 1 is at the H level. The control signal Mode 2 defines an operation/transfer period. For example, the operation/transfer period may be defined as a period during which the control signal Mode 2 is at the H level. These control signals are supplied from the processor 140 via the memory controller 130.

The delay amount determination circuit 1260 includes phase comparators 1262 and 1266 and an up/down counter 1264.

The phase comparator 1262 is activated by the control signal Mode 1 during an initialization period. The phase comparator 1262 compares the phase of the clock signal CLK'(0) against that of the data signal Data. If the phase of the data signal Data is advanced relative to that of the clock signal CLK'(0), the phase comparator 1262 outputs an "up" signal up1 to the up/down counter 1264. If the phase of the data signal Data is lagging behind that of the clock signal CLK'(0), the phase comparator 1262 outputs a "down" signal down to the up/down counter 1264.

In response to the "up" signal up1, the up/down counter 1264 shifts its output so as to decrease the delay amount applied to the clock signal CLK. For example, the up/down counter 1264 shifts its output from "CTRL(L)=H" to "CTRL(2)=H" in response to the "up" signal up1. In response to the "down" signal down1, the up/down counter 1264 shifts its output so as to increase the delay amount applied to the clock signal CLK. For example, the up/down Counter 1264 shifts its output from "CTRL(2)=H" to "CTRL(1)=H" in response to the "down" signal down1.

The phase comparator 1266 is activated by the control signal Mode 2 during an operation/transfer period. The phase comparator 1266 compares the phase of the clock signal CLK'(0) against that of the data signal Data. If the phase of the data signal Data is advanced relative to that of the clock signal CLK'(0), the phase comparator 1266 outputs an "up". signal up2 to the holding circuit 125g. If the phase of the data signal Data is lagging behind that of the clock signal CLK'(0), the phase comparator 1266 outputs a "down" signal down2 to the holding circuit 125g.

The holding circuit 125g outputs an "up" signal up3 or a "down" signal down3 to each of the synchronization circuits 125a to 125f in response to the "up" signal up2 or the "down" signal down2. As a result, the synchronization circuits 125a to 125f can be controlled simultaneously.

Thus, the synchronization circuit 125a outputs the clock signal CLK'(0), which is synchronized with the data signal Data. The latch circuit 127a latches the data signal Data in response to an edge of the clock signal CLK'(0). The clock signal CLK'(0) and the data signal Data(0) output from the latch circuit 127a are output to the memory core 124.

Similarly, the clock signals CLK'(1) to CLK'(5), the data signals Data(1) to Data(3), and the control signals Cont(0) to Cont(1) are output to the memory core 124. The memory core 124 operates in accordance with one of the clock signals CLK'(0) to CLK'(5).

Figure 9:
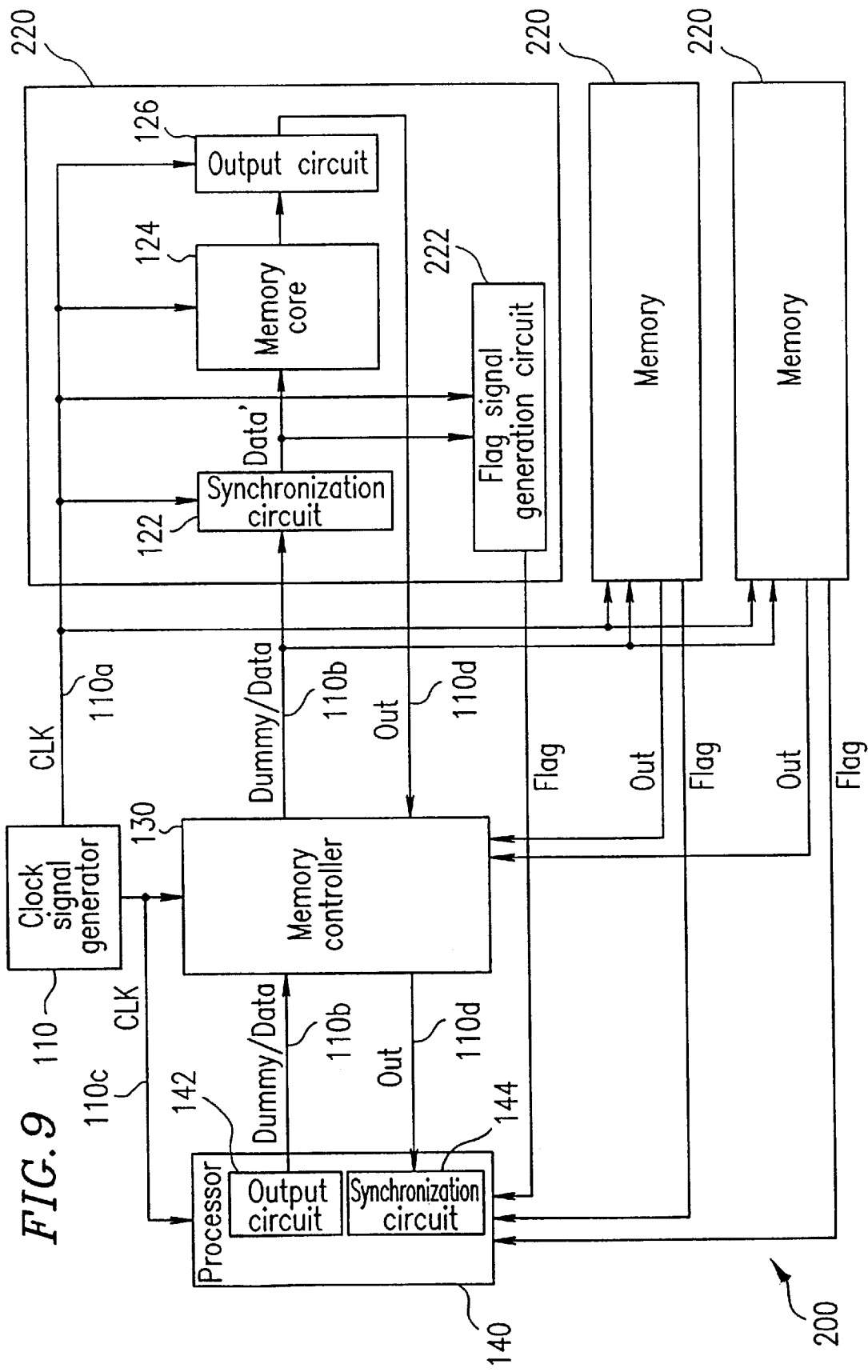
FIG. 9 is a block diagram illustrating an exemplary structure of a memory system 200.

Hereinafter, another application example of the present invention in the form of a memory system will be described. FIG. 9 illustrates an exemplary structure of a memory system 200. The memory system 200 includes a plurality of memories 220. Each memory 220 includes a synchronization circuit 122, a memory core 124, an output circuit 126, and a flag signal generation circuit 222. In FIG. 9, constituent elements which also appear in the memory system 100 shown in FIG. 5A are denoted by the same reference numerals as used therein, and the descriptions thereof are omitted.

In the case where the memory controller 130 controls the plurality of memories 220, it may pose an obstacle in the enhancement of the operating speed of the memory system 200 to perform a synchronization process during an initialization period every time before transferring the data signal Data because it may lead to an elongated initialization period. Therefore, in accordance with the memory system 200, the synchronization circuit 122 is controlled so that, if the synchronization circuit 122 has performed a synchronization process during an operation/transfer period, the synchronization circuit 122 does not perform a synchronization process during a subsequent initialization period following that operation/transfer period.

Figure 10A:
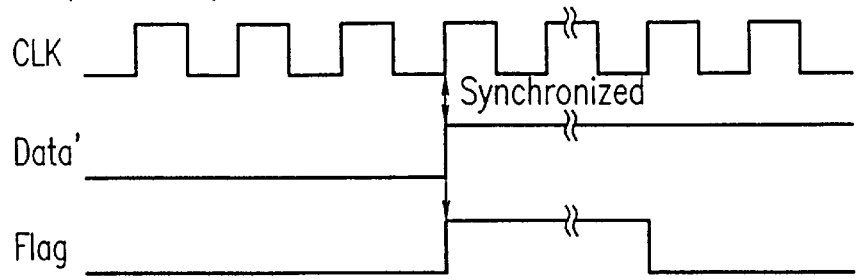
FIG. 10A is a timing diagram illustrating the waveform of a flag signal Flag.

The flag signal generation circuit 222 generates a flag signal Flag (see FIG. 10A) which takes the H level for only a predetermined period of time after the time at which a synchronization process is performed by the synchronization circuit 122 (i.e., the time at which an edge of the clock signal CLK and an edge of the data signal Data' coincide). The period during which the flag signal Flag takes the H level is preferably in the range of about ten nanoseconds (ns) to about several dozen ns. Especially in the case where the clock signal CLK has a high frequency, it is preferable that the period during which the flag signal Flag takes the H level be 20 ns or less.

Figure 10B:
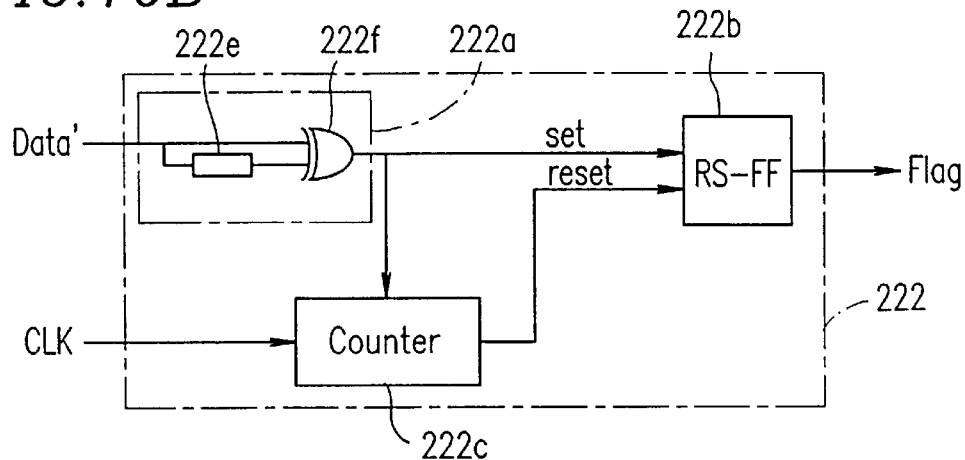
FIG. 10B is a block diagram illustrating an exemplary structure of a flag signal generation circuit 222.

FIG. 10B illustrates an exemplary structure of the flag signal generation circuit 222. The flag signal generation circuit 222 includes a detector 222a for detecting a transition in the level of the data signal Data', an RS flip-flop (hereinafter "RS-FF") 222b, and a counter 222c.

The detector 222a generates a pulse signal set in response to the transition in the level of the data signal Data'. The pulse signal set is supplied to the RS-FF 222b and the counter 222c. The detector 222a includes, for example, a delay element 222e and an exclusive OR element 222f.

The RS-FF 222b causes the flag generation signal Flag to go from the L level to the H level in response to the pulse signal set.

The counter 222c resets its count value in response to the pulse signal set. Thereafter, the counter 222c increments the count value in response to an edge of the clock signal CLK. Once the count value of the counter 222c reaches a predetermined value, the counter 222c outputs a pulse signal reset to the RS-FF 222b.

The RS-FF 222b causes the flag generation signal Flag to go from the H level to the L level in response to the pulse signal reset.

Thus, the flag signal Flag, which takes the H level for a predetermined period of time after the time at which the data signal Data' undergoes a transition in level, is generated.

The flag signal Flag is transferred to the processor 140. The processor 140 determines whether or not to perform a synchronization process in accordance with the level of the flag signal Flag.

In accordance with the above processes, it is possible to avoid a synchronization process being performed during an initialization period for a device that has a sufficiently high synchronization accuracy. As a result, the number of devices (e.g., memories) which require a synchronization process during an initialization period can be reduced, thereby optimizing the synchronization process. As a result, the operating speed of the memory system 200 can be enhanced.

The above-provided example is described to operate in such a manner that, when a flag signal Flag is at the H level, no synchronization process is performed in a subsequent initialization period in the memory 220 associated with that flag signal Flag; and when a flag signal Flag is at the L level, a synchronization process is performed in a subsequent initialization period in the memory 220 associated with that flag signal Flag. Alternatively, the operation of a memory 220 that is associated with a flag signal Flag which is at the L level can be immediately forced to terminate, thereby causing the memory 220 to transit from an operation/transfer period to an initialization period so that a synchronization process can be performed during that initialization period.

EXAMPLE 2

Figure 11:
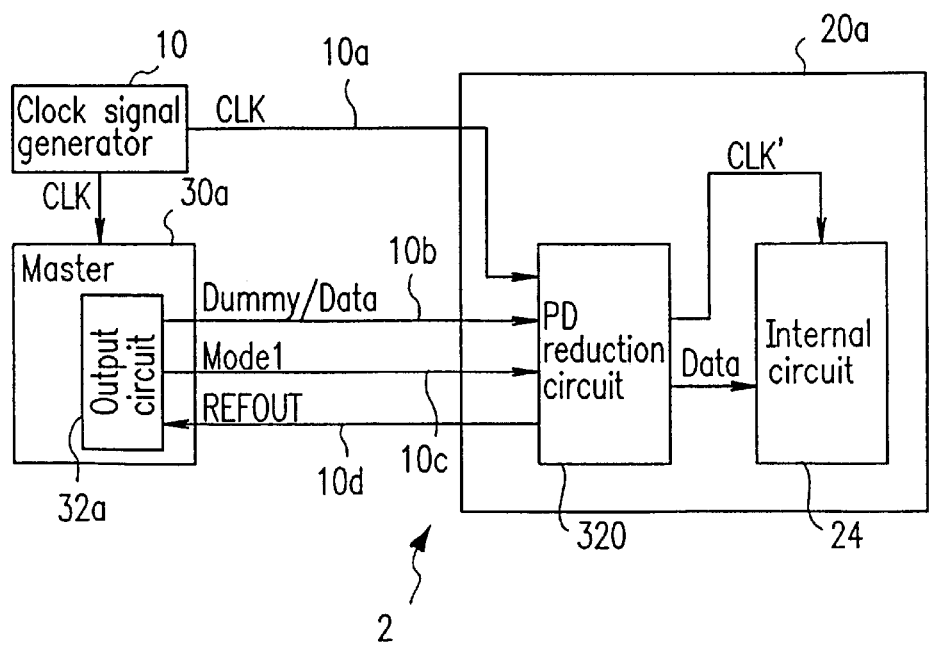
FIG. 11 is a block diagram illustrating an exemplary structure of a system 2 according to Example 2 of the present invention.

FIG. 11 illustrates an exemplary structure of a system 2 according to Example 2 of the present invention. The system 2 includes a clock signal generator 10, a slave 20a, and a master 30a. In FIG. 11, constituent elements which also appear in FIG. 1 are denoted by the same reference numerals as used therein, and the descriptions thereof are omitted.

The master 30a includes an output circuit 32a. The output circuit 32a outputs a dummy pattern signal Dummy to a data signal line 10b during an initialization period, and outputs a data signal Data to a data signal line 10b during an operation/transfer period. The output circuit 32a outputs a control signal Mode 1 (which defines an initialization period) to a control signal line 10c. The output circuit 32a receives a control signal REFOUT via a control signal line 10d. The control signal REFOUT is a control signal that indicates that an initialization period is terminated. For example, the completion of an initialization period can be indicated by the control signal REFOUT going from the H level to the L level.

The slave 20a includes a PD reduction circuit 320 and an internal circuit 24.

Figure 12:
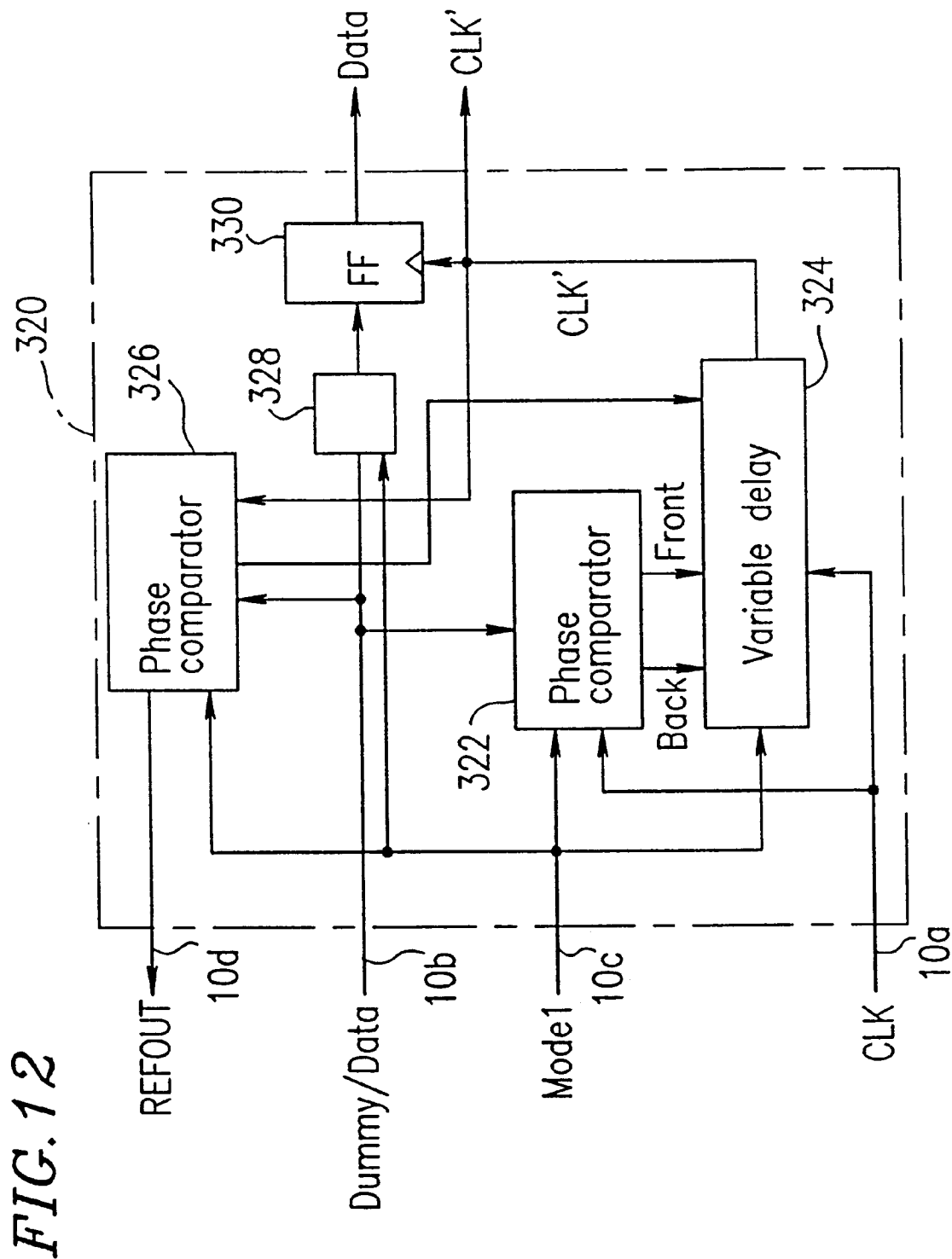
FIG. 12 is a block diagram illustrating an exemplary structure of a phase difference reduction circuit 320.

FIG. 12 illustrates an exemplary configuration of the PD reduction circuit 320. The PD reduction circuit 320 receives a clock signal CLK via a clock signal line 10a, and a dummy pattern signal Dummy and a data signal Data via the data signal line 10b. The PD reduction circuit 320 further receives the control signal Mode 1 (which defines an initialization period) via the control signal line 10c.

The PD reduction circuit 320 delays the clock signal CLK so that the phase difference between the clock signal CLK and the dummy pattern signal Dummy is reduced. Hereinafter, a clock signal CLK having been thus delayed will be referred to as a clock signal CLK'.

The PD reduction circuit 320 outputs the control signal REFOUT, which indicates a result of comparison between the phase of the dummy pattern signal Dummy and the phase of the clock signal CLK', to the control signal line 10d.

The operation of the PD reduction circuit 320 will be described below with reference to FIG. 12.

First, the master 30a (FIG. 11) causes the control signal Mode 1 to go from the L level to the H level, thereby starting an initialization period. An initialization period is defined as a period during which the control signal Mode 1 takes the H level.

During an initialization period, a dummy pattern signal Dummy is input to the PD reduction circuit 320 via the data signal line 10b. Herein, it is assumed that the dummy pattern signal Dummy is a clock signal having the same cycle as that of the clock signal CLK.

During an initialization period, a phase comparator 322 is activated by the control signal Mode 1. The phase comparator 322 compares the phase of the clock signal CLK against that of the dummy pattern signal Dummy. If the phase of the clock signal CLK is advanced relative to that of dummy pattern signal Dummy, the phase comparator 322 out puts a pulse signal Back (having a pulse width corresponding to the phase shift) to a variable delay circuit 324. If the phase of the clock signal CLK is lagging behind that of the dummy pattern signal Dummy, the phase comparator 322 outputs a pulse signal Front (having a pulse width corresponding to th e phase shift) to the variable delay circuit 324.

The variable delay circuit 324 increases the delay amount in response to the pulse signal Back, or decreases the delay. amount in response to the pulse signal Front. The clock signal CLK is delayed by the delay amount which has been set in the variable delay circuit 324. Thus, the delay amount of the variable delay circuit 324 can be determined so that an edge of the clock signal CLK and an edge of the dummy pattern signal Dummy coincide.

The phase comparator 326 compares the phase of the clock signal CLK' against that of the dummy pattern signal Dummy. If the phase difference between the clock signal CLK' and the dummy pattern signal Dummy is greater than a predetermined value, the control signal REFOUT is at the L level. If the phase difference between the clock signal CLK' and the dummy pattern signal Dummy is equal to or smaller than the predetermined value, the control signal REFOUT is at the H level. The predetermined value is ideally zero, but in practice only needs to be a value which is sufficiently close to zero. The delay amount in the variable delay circuit 324 is locked in response to the level of the control signal REFOUT going from the L level to the H level.

A switch 328 outputs a signal which is input via the data signal line 10b to a holding circuit 330 when the control signal Mode 1 is at the L level, but does not output the signal which is input via the data signal line 10b to the holding circuit 330 when the control signal Mode 1 is at the H level.

The holding circuit 330 holds a signal which is output from the switch 328 and outputs the signal to an internal circuit 24 (FIG. 11) in accordance with the clock signal CLK'.

After confirming that the level of the control signal REFOUT has changed from the L level to the H level, the master 30a (FIG. 11) causes the control signal Mode 1 to go from the H level to the L level, thereby ending the initialization period.

Subsequently an operation/transfer period is started. During an operation/transfer period, the data signal Data is input to the PD reduction circuit 320 via the data signal line 10b.

It is unnecessary to output the control signal REFOUT in the case where it is possible to predict the lock time, i.e., a period of time required from the beginning of an initialization period until the locking of the delay amount in the variable delay circuit 324. In such cases, the transfer operation for the data signal Data can simply be started after the lock time has elapsed.

Figure 13:
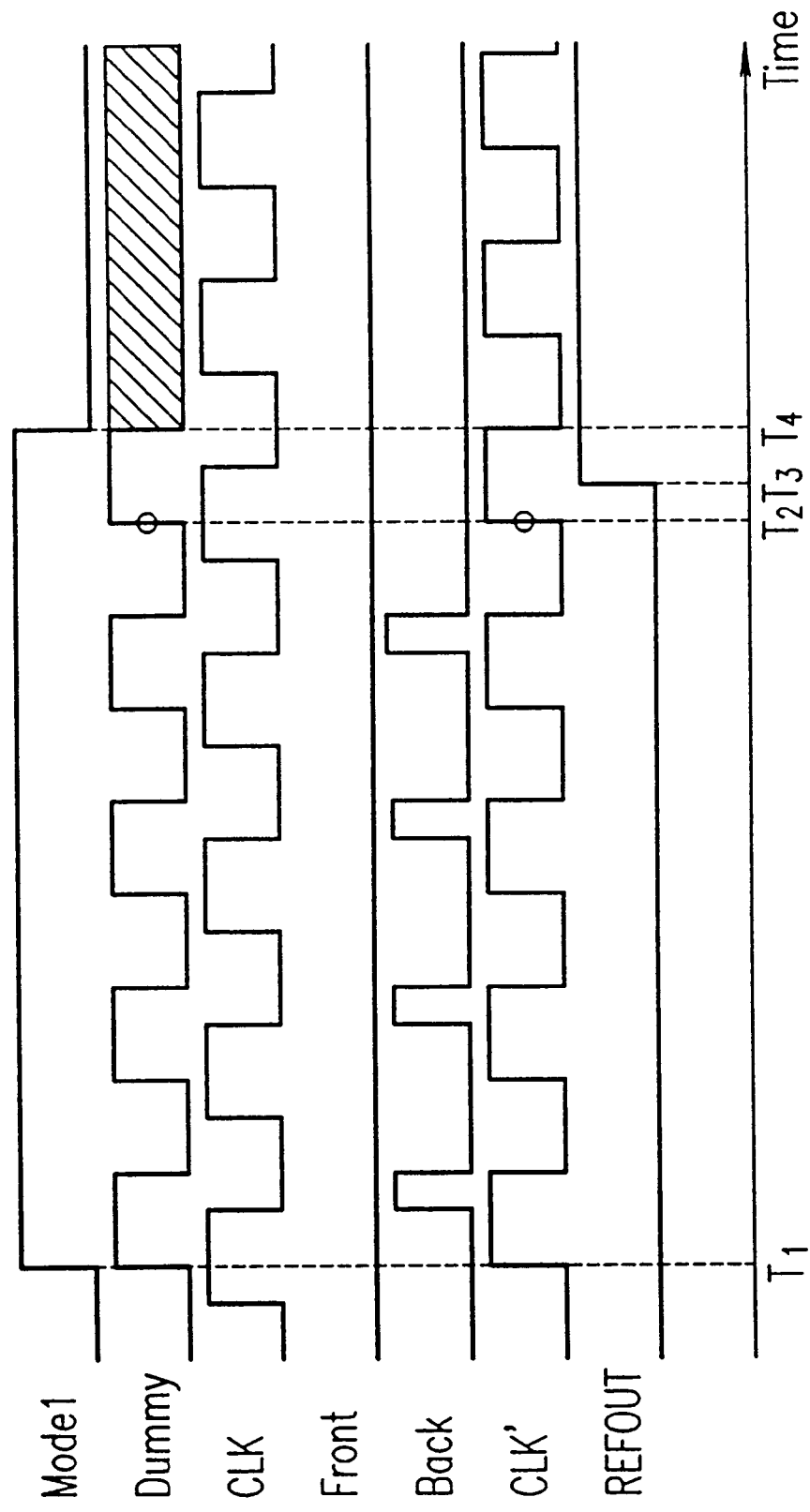
FIG. 13 is a timing diagram illustrating the waveforms of various signals employed in the phase difference reduction circuit 320.

FIG. 13 illustrates the waveforms of various signals employed in the phase difference reduction circuit 320.

At time $T_1$, the control signal Mode 1 goes from the L level to the H level, thereby starting an initialization period. Since the phase of the clock signal CLK is advanced relative to that of the dummy pattern signal Dummy at time $T_1$, the delay amount in the variable delay circuit 324 is increased by a pulse signal Back. As a result, the clock signal CLK is delayed by the delay amount which has been set in the variable delay circuit 324.

At time $T_2$, the clock signal CLK' and the dummy pattern signal Dummy match in phase. In FIG. 13, blank circles (○) indicate coincidence between an edge of the clock signal CLK' and an edge of the dummy pattern signal Dummy.

At time $T_3$, the control signal REFOUT goes from the L level to the H level in response to the absence of phase shift between the clock signal CLK' and the dummy pattern signal Dummy.

Figure 14:
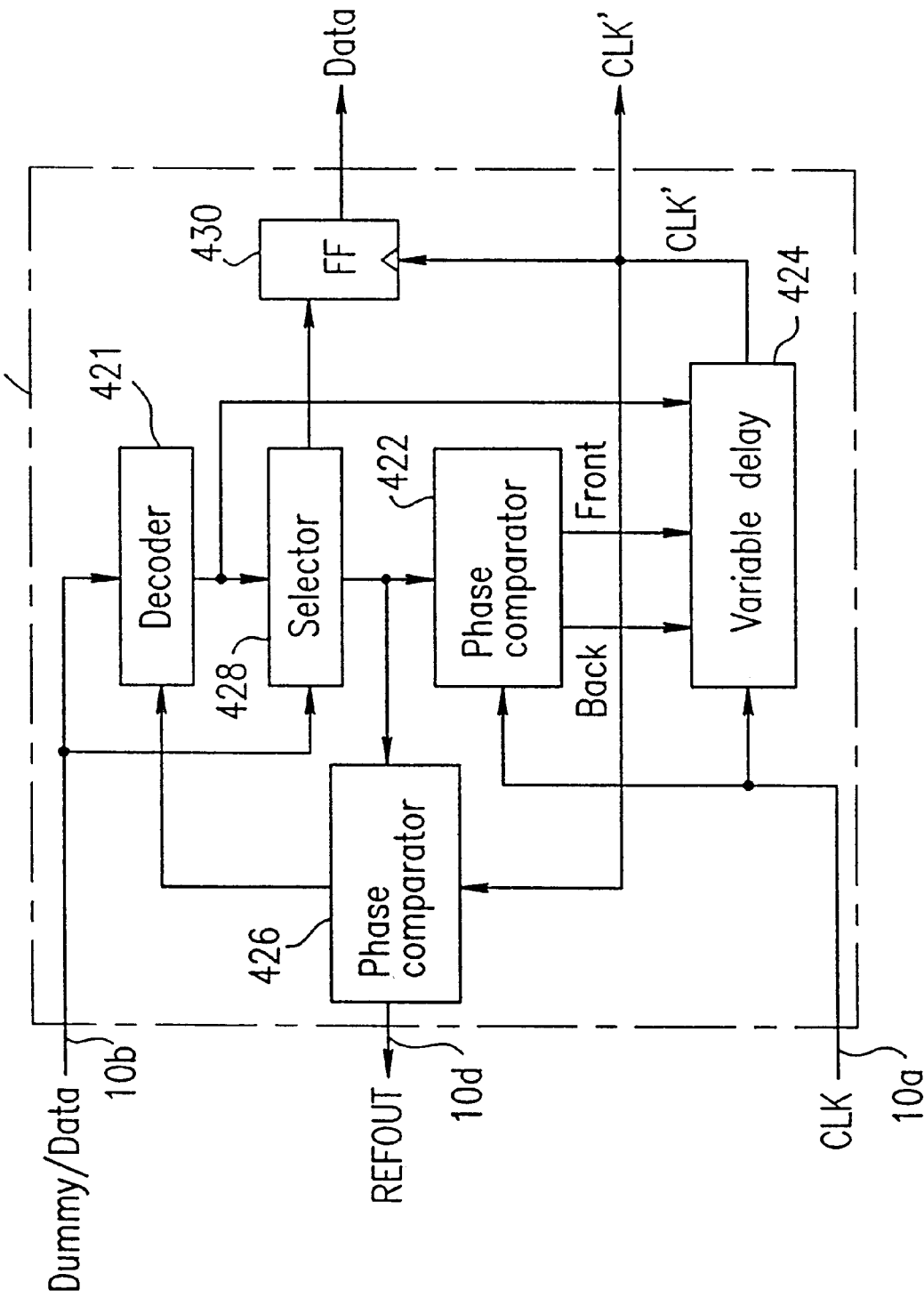
FIG. 14 is a block diagram illustrating an exemplary structure of a phase difference reduction circuit 420.

At time $T_4$, the control signal Mode 1 goes from the H level to the L level, thereby ending the initialization periods FIG. 14 illustrates an exemplary structure of a PD reduction circuit 420. The PD reduction circuit 420 is interchangeable with the PD reduction circuit 320 shown in FIG. 12.

The PD reduction circuit 420 detects the beginning of an initialization period by detecting a predetermined initialization pattern, instead of using a control signal Mode 1. Therefore, the control signal Mode 1 is not input to the PD reduction circuit 420.

The PD reduction circuit 420 receives a clock signal CLK via a clock signal line 10a, and a dummy pattern signal Dummy and a data signal Data via a data signal line 10b.

The PD reduction circuit 420 delays the clock signal CLK so that the phase difference between the clock signal CLK and the dummy pattern signal Dummy is reduced. Hereinafter, a clock signal CLK having been thus delayed will be referred to as a clock signal CLK'.

The PD reduction circuit 420 outputs a control signal REFOUT, which indicates a result of comparison between the phase of the dummy pattern signal Dummy and the phase of the clock signal CLK'.

The operation of the PD reduction circuit 420 will be described be low with reference to FIG. 14.

The decoder 421 deter mines whether or not a predetermined initialization pattern is included in a signal which is input via the data signal line 10b. The predetermined initialization pattern can be, foe example, a signal having a pattern HLHHLL (see FIG. 15A).

When detecting an initialization pattern, the decoder 421 recognizes that an initialization period will be started. During an initialization period, the dummy pattern signal Dummy is input to the PD reduction circuit 420 via the data signal line 10b. Herein, it is assumed that the dummy pattern signal Dummy is a clock signal having the same cycle as that of the clock signal CLK. The decoder 421 switches a selector 428 so as to output a signal which is input via the data signal line 10b to a phase comparator 422.

The functions and operations of the phase comparator 422 and the variable delay circuit 424 are identical with those of the phase comparator 322 and the variable delay circuit 324 shown in FIG. 12. Therefore, the detailed descriptions thereof will be omitted.

The phase comparator 426 generates the control signal REFOUT in the same manner as in the phase comparator 326 (FIG. 12). The phase comparator 426 outputs a signal indicating that the initialization period is terminated to the decoder 421 in response to the control signal REFOUT going from the L level to the H level.

The decoder 421 switches the selector 428 so as to output the signal which is input via the data signal line 10b to a holding circuit 430. The decoder 421 locks the delay amount to be applied in the variable delay circuit 424.

The holding circuit 430 holds a signal which is output from the selector 428 and outputs the signal to an internal circuit 24 (FIG. 11) in accordance with the clock signal CLK'.

After confirming that the level of the control signal REFOUT has changed from the L level to the H level, the master 30a (FIG. 11) begins a transfer operation for the data signal Data.

It is unnecessary to output the control signal REFOUT in the case where it is possible to predict the look time, i.e., a period of time required from the beginning of an initialization period until the locking of the delay amount in the variable delay circuit 424. In such cases, the transfer operation for the data signal Data can simply be started after the lock time has elapsed.

Figure 15:
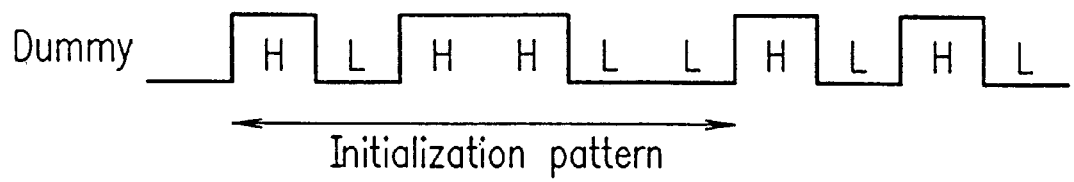
FIG. 15A is a timing diagram illustrating an exemplary initialization pattern.
FIG. 15B is a timing diagram illustrating the waveforms of various signals in the case where the phase of a clock signal CLK is lagging behind the phase of a dummy pattern signal Dummy.
FIG. 15C is a timing diagram illustrating the waveforms of various signals in the case where the phase of a clock signal CLK is advanced relative to the phase of a dummy pattern signal Dummy.

FIG. 15B illustrates the waveforms of various signals in the case where the phase of the clock signal CLK is lagging behind the phase of the dummy pattern signal Dummy.

A pulse signal Front having a pulse width W1 corresponding to the phase difference between the clock signal CLK and the dummy pattern signal Dummy is output to the variable delay circuit 424. As a result, the clock signal CLK is delayed so that the clock signal CLK' and the dummy pattern signal Dummy match in phase. In FIG. 15B, the two blank circles (○) indicate an edge of the clock signal CLK and a corresponding edge of the clock signal CLK'.

FIG. 15C illustrates the waveforms of various signals in the case where the phase of the clock signal CLK is advanced relative to the phase of the dummy pattern signal Dummy.

A pulse signal Back having a pulse width W2 corresponding to the phase difference between the clock signal CLK and the dummy pattern signal Dummy Is output to the variable delay circuit 424. As a result, the clock signal CLK is delayed so that the clock signal CLK' and the dummy pattern signal Dummy match in phase. In FIG. 15C, the two blank circles (○) indicate an edge of the clock signal CLK and a corresponding edge of the clock signal CLK'.

As described above, the PD reduction circuits 320 and 420 can reduce the phase difference between the clock signal CLK and the data signal Data by delaying the clock signal CLK. Alternatively, the PD reduction circuits 320 and 420 can be modified to reduce the phase difference between the clock signal CLK and the data signal Data by delaying the data signal Data. Such modifications of the PD reduction circuits 320 and 420 are also encompassed by the present invention.

EXAMPLE 3

Figure 16:
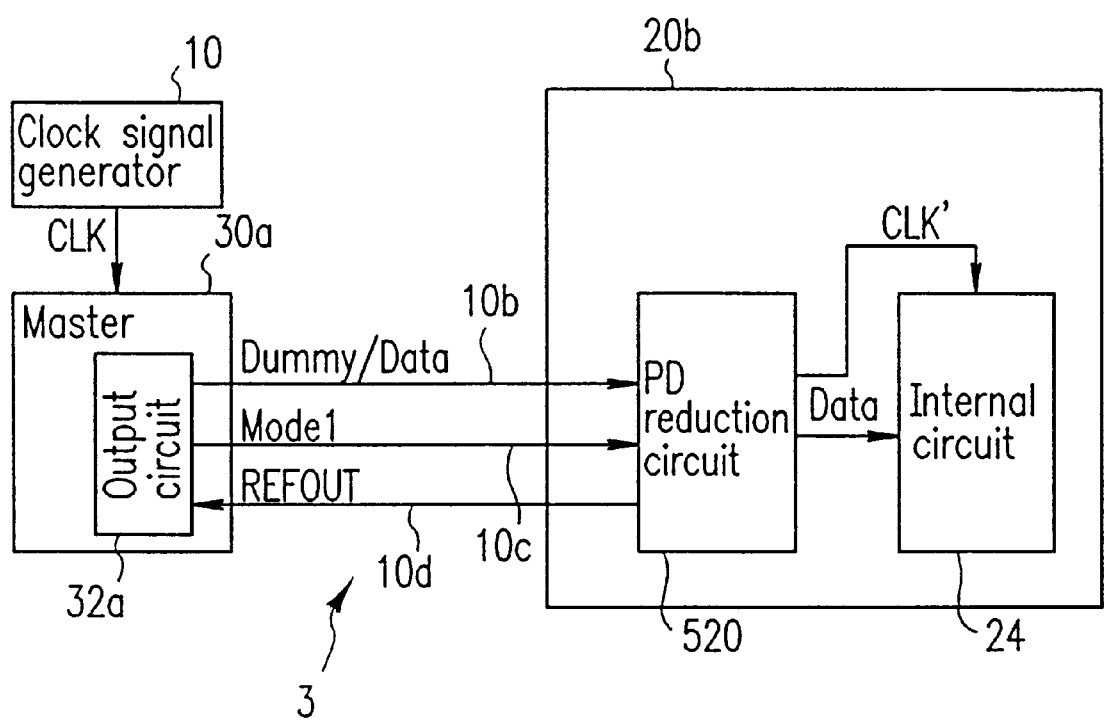
FIG. 16 is a block diagram illustrating an exemplary structure of a system 3 according to Example 3 of the present invention.

FIG. 16 illustrates an exemplary structure of a system 3 according to Example 3 of the present invention. The system 3 includes a clock signal generator 10, a slave 20b, and a master 30a. In FIG. 16, constituent elements which also appear in FIG. 11 are denoted by the same reference numerals as used therein, and the descriptions thereof are omitted.

The master 30a receives and operates in accordance with a clock signal CLK. The slave 20b does not receive the clock signal CLK. The slave 20b internally generates a clock signal CLK' within the slave 20b and operates in accordance with the clock signal CLK'.

In accordance with the system 3, it is unnecessary to transfer the clock signal CLK, which is supplied to the sender circuit, to the recipient circuit, Such a system configuration is especially effective in the case where there is an extremely large distance between the sender circuit and the recipient circuit.

The slave 20b includes a PD reduction circuit 520 and an internal circuit 24. The internal circuit 24 operates in accordance with the clock signal CLK'.

Figure 17:
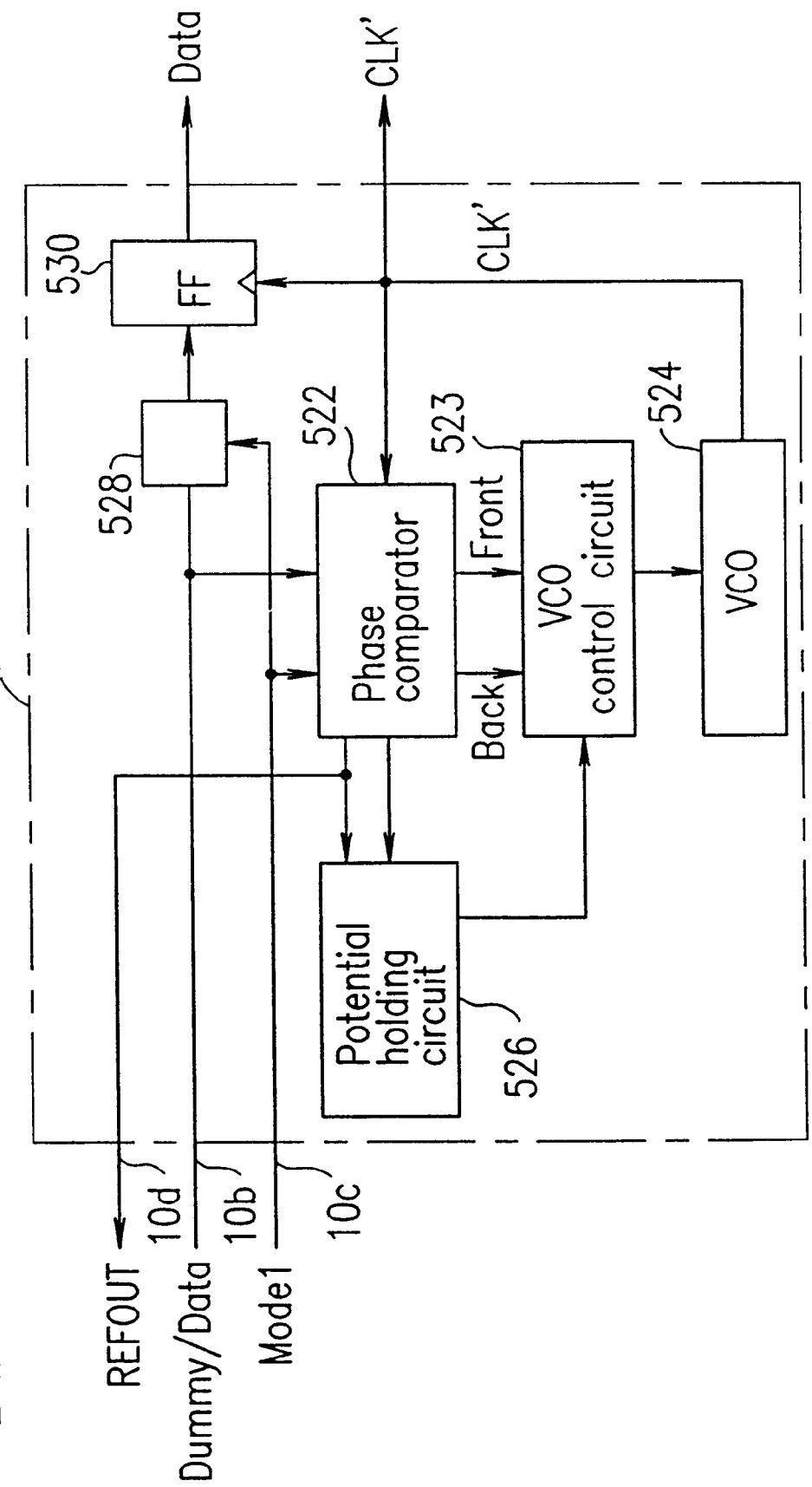
FIG. 17 is a block diagram illustrating an exemplary structure of a phase difference reduction circuit 520.

FIG. 17 illustrates an exemplary configuration of the PD reduction circuit 520. The PD reduction circuit 520 receives a dummy pattern signal Dummy and a data signal Data via a data signal line 10b. The PD reduction circuit 520 further receives a control signal Mode 1 (which defines an initialization period) via a control signal line 10c.

The PD reduction circuit 520 generates the clock signal CLK' so that the phase difference between the dummy pattern signal Dummy and the clock signal CLK' is reduced.

The PD reduction Circuit 520 outputs a control signal REFOUT, which indicates a result of comparison between the phase of the dummy pattern signal Dummy and the phase of the clock signal CLK', to a control signal line 10d.

The operation of the PD reduction circuit 520 will be described below with reference to FIG. 17.

First, the master 30a (FIG. 16) causes the control signal Mode 1 to go from the L level to the H level, thereby starting an initialization period. An initialization period is defined as a period during which the control signal Mode 1 takes the H level.

During an initialization period, a dummy pattern signal Dummy is input to the PD reduction circuit 520 via the data signal line 10b. Herein, it is assumed that the dummy pattern signal Dummy is a clock signal having the same cycle as that of the clock signal CLK.

During an initialization period, a phase comparator 522 is activated by the control signal Mode 1. The phase comparator 522 compares the phase of the clock signal CLK' against that of the dummy pattern signal Dummy. The clock signal CLK' is generated by a voltage controlled oscillator (VCO) 524. If the phase of the clock signal CLK' is advanced relative to that of dummy pattern signal Dummy, the phase comparator 522 outputs a pulse signal Back (having a pulse width corresponding to the phase shift) to a VCO control circuit 523. If the phase of the clock signal CLK' is lagging behind that of the dummy pattern signal Dummy, the phase comparator 522 outputs a pulse signal Front (having a pulse width corresponding to the phase shift) to the VCO control circuit 523.

The VCO control circuit 523 controls the VCO 524 so as to decrease its oscillation frequency in response to the pulse signal Back, or to increase the oscillation frequency in response to the pulse signal Front. The phase of the clock signal CLK' is adjusted by the VCO 524. Thus, the oscillation frequency of the VCO 524 can be determined so that an edge of the clock signal CLK' and an edge of the dummy pattern signal Dummy coincide.

The phase comparator 522 generates the control signal REFOUT. If the phase difference between the clock signal CLK' and the dummy pattern signal Dummy is greater than a predetermined value, the control signal REFOUT is at the L level. If the phase difference between the clock signal CLK' and the dummy pattern signal Dummy is equal to or smaller than the predetermined value, the control signal REFOUT is at the H level. The predetermined value is ideally zero, but in practice only needs to be a value which is sufficiently close to zero.

A potential holding circuit 526 holds a potential supplied from the phase comparator 522 in response to the level of the control signal REFOUT going from the L level to the H level. The potential held by the potential holding circuit 526 is supplied to the VCO control circuit 523, thereby locking the oscillation of the VCO 524.

A switch 528 outputs a signal which is input via the data signal line 10b to the holding circuit 530 when the control signal Mode 1 is at the L level, but does not output the signal which is input via the data signal line 10b to the holding circuit 530 when the control signal Mode 1 is at the H level.

The holding circuit 530 holds a signal which is output from the switch 528 and outputs the signal to an internal circuit 24 (FIG. 16) in accordance with the clock signal CLK'.

After confirming that the level of the control signal REFOUT has changed from the L level to the H level, the master 30a (FIG. 16) causes the control signal Mode 1 to go from the H level to the L level, thereby ending the initialization period.

Subsequently an operation/transfer period is started. During an operation/transfer period, the data signal Data is input to the PD reduction circuit 520 via the data signal line 10b.

It is unnecessary to output the control signal REFOUT in the case where it is possible to predict the lock time, i.e., a period of time required from the beginning of an initialization period until the locking of the oscillation of the VCO 524. In such cases, the transfer operation for the data signal Data can simply be started after the lock time has elapsed.

Figure 18:
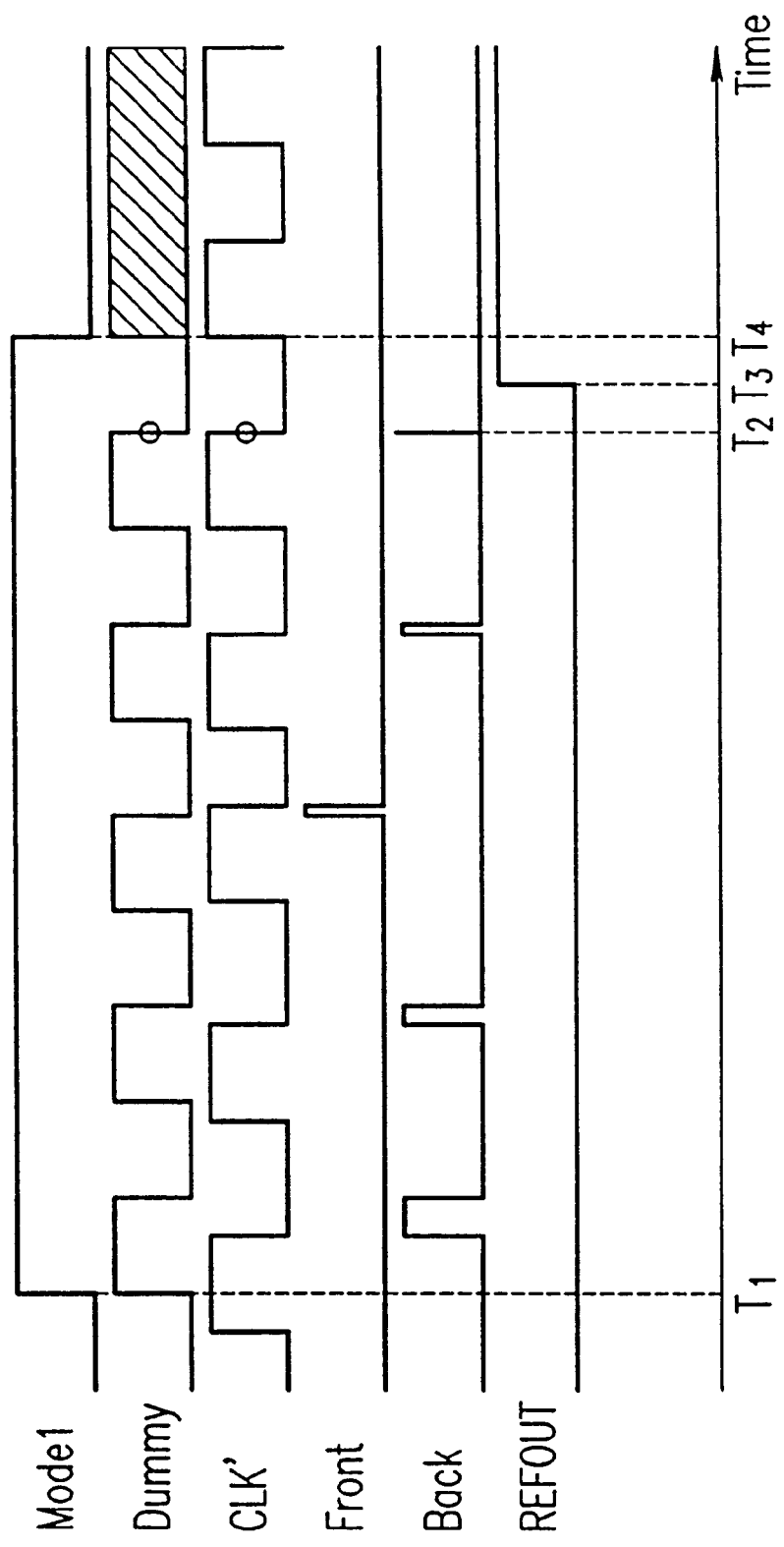
FIG. 18 is a timing diagram illustrating the waveforms of various signals employed in the phase difference reduction circuit 520.

FIG. 18 illustrates the waveforms of various signals employed in the phase difference reduction circuit 520.

At time $T_1$, the control signal Mode 1 goes from the L level to the H level, thereby starting an initialization period.

Since the phase of the clock signal CLK' is advanced relative to that of the dummy pattern signal Dummy at time $T_1$, the oscillation frequency of the VCO 524 is decreased by a pulse signal Back. Subsequently, the oscillation frequency of the VCO 524 is adjusted in response to the pulse signal Front and the pulse signal Back.

At time $T_2$, the clock signal CLK' and the dummy pattern signal Dummy match in phase. In FIG. 18, blank circles (○) indicate coincidence between an edge of the clock signal CLK' and an edge of the dummy pattern signal Dummy.

At time $T_3$, the control signal REFOUT goes from the L level to the H level in response to the absence of phase shift between the clock signal CLK' and the dummy pattern signal Dummy.

At time $T_4$, the control signal Mode 1 goes from the H level to the L level, thereby ending the initialization period.

Figure 19:
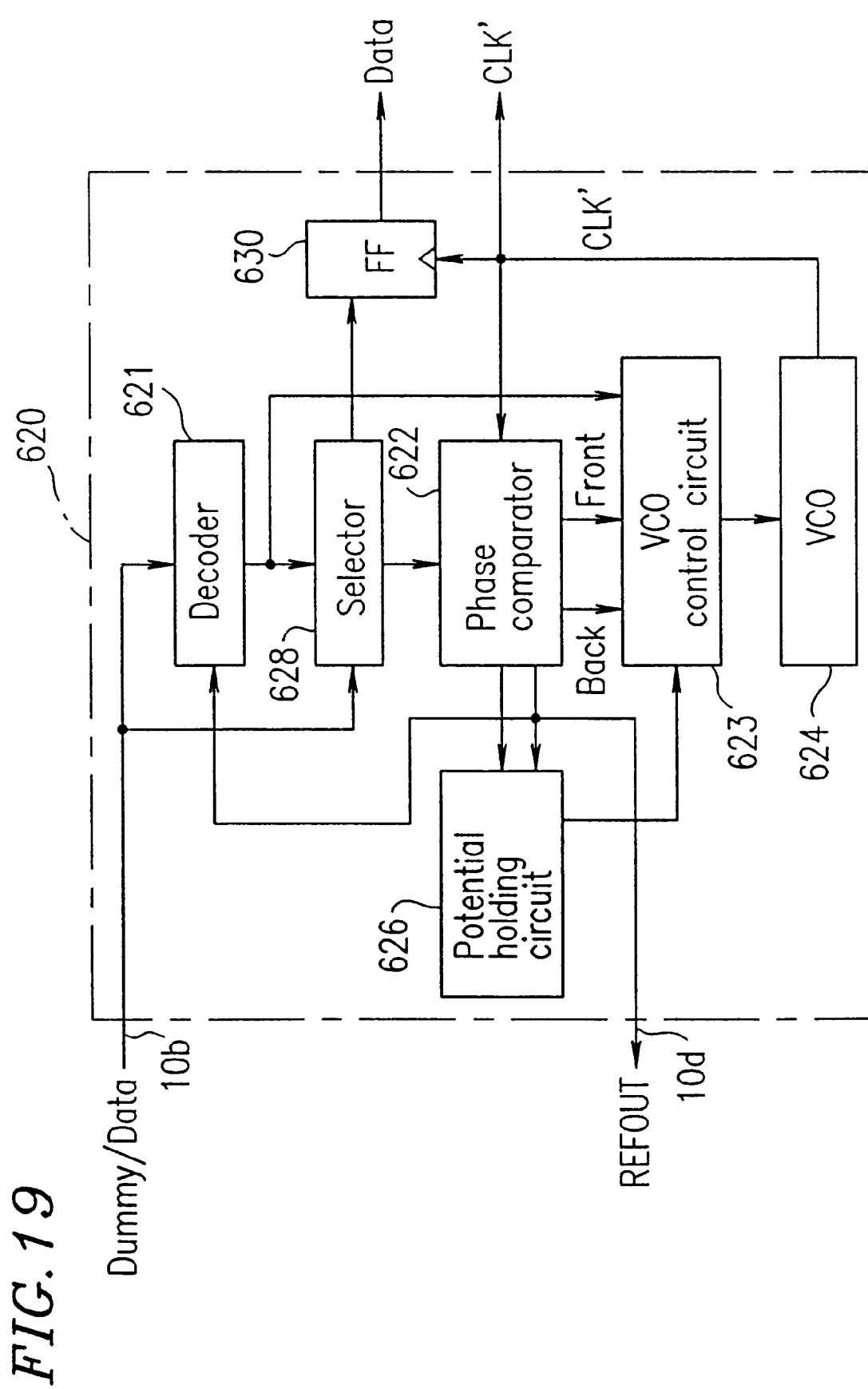
FIG. 19 is a block diagram illustrating an exemplary structure of a phase difference reduction circuit 620.

FIG. 19 illustrates an exemplary structure of a PD reduction circuit 620. The PD reduction circuit 620 is interchangeable with the PD reduction circuit 520 shown in FIG. 17.

The PD reduction circuit 620 detects the beginning of an initialization period by detecting a predetermined initialization pattern, instead of using a control signal Mode 1. Therefore, the control signal Mode 1 is not input to the PD reduction circuit 620.

The PD reduction circuit 620 receives a dummy pattern signal Dummy and a data signal Data via a data signal line 10b.

The PD reduction circuit 620 generates a clock signal CLK' so that the phase difference between the dummy pattern signal Dummy and. the clock signal CLK' is reduced.

The PD reduction circuit 620 outputs a control signal REFOUT, which indicates a result of comparison between the phase of the dummy pattern signal Dummy and the phase of the clock signal CLK'.

The operation of the PD reduction circuit 620 will be described below with reference to FIG. 19.

The decoder 621 determines whether or not a predetermined initialization pattern is included in a signal which is input via the data signal line 10b. The predetermined initialization pattern can be, for example, a signal having a pattern HLHHLL (see FIG. 20A).

When detecting an initialization pattern, the decoder 621 recognizes that an initialization period will be started. During an initialization period, the dummy pattern signal Dummy is input to the PD reduction circuit 620 via the data signal line 10b. Herein, it is assumed that the dummy pattern signal Dummy is a clock signal having the same cycle as that of the clock signal CLK. The decoder 621 switches a selector 628 so as to output a signal which is input via the data signal line 10b to a phase comparator 622.

The functions and operations of the phase comparator 622, a VCO control circuit 623, and a VCO 624 are identical with those of the phase comparator 522, the VCO control circuit 523, and the VCO 524 shown in FIG. 17. Therefore, the detailed descriptions thereof will be omitted.

The phase comparator 622 generates the control signal REFOUT in the same manner as in the phase comparator 522 (FIG. 17).

A potential holding circuit 626 holds a signal which is supplied from the phase comparator 622 in response to the control signal REFOUT going from the L level to the H level. The potential held by the potential holding circuit 626 is supplied to the VCO control circuit 623.

The decoder 621 switches the selector 628 so as to output the signal which is input via the data signal line 10b to a holding circuit 630 in response to the control signal REFOUT going from the L level to the H level.

The holding circuit 630 holds a signal which is output from the selector 628 and outputs the signal to an internal circuit 24 (FIG. 16) in accordance with the clock signal CLK'.

After confirming that the level of the control signal REFOUT has changed from the L level to the H level, the master 30a (FIG. 16) begins a transfer operation for the data signal Data.

It is unnecessary to output the control signal REFOUT in the case where it is possible to predict the lock time, i.e., a period of time required from the beginning of an initialization period until the locking of the oscillation of the VCO 624. In such cases, the transfer operation for the data signal Data can simply be started after the lock time has elapsed.

FIG. 20B is a diagram illustrating how a clock signal CLK' and a dummy pattern signal Dummy are brought into matching phase.

As described above, the PD reduction circuits 520 and 620 can reduce the phase difference between the clock signal CLK' and the data signal Data by adjusting the oscillation frequency of the VCOs 524 and 624, respectively. Alternatively, the PD reduction circuits 520 and 620 can be modified to reduce the phase difference between the clock signal CLK' and the data signal Data by delaying the data signal Data. Such modifications of the PD reduction circuits 520 and 620 are also encompassed by the present invention.

In the above-described system 3, the VCO 524 (or 624) continues to oscillate during an operation/transfer period (for transferring the data signal Data) in the same oscillation state to which the VCO 524 (or 624) was locked during an initialization period. Therefore, the clock signal CLK' and the data signal Data may have a phase shift during the operation/transfer period.

Hereinafter, a correction process for minimizing the above-mentioned phase shift which may occur during an operation/transfer period. This correction process is to be performed under the precondition that the cycle of the data signal Data is a multiple (by a pre determined factor) of that of the clock signal CLK'.

Figure 21A:
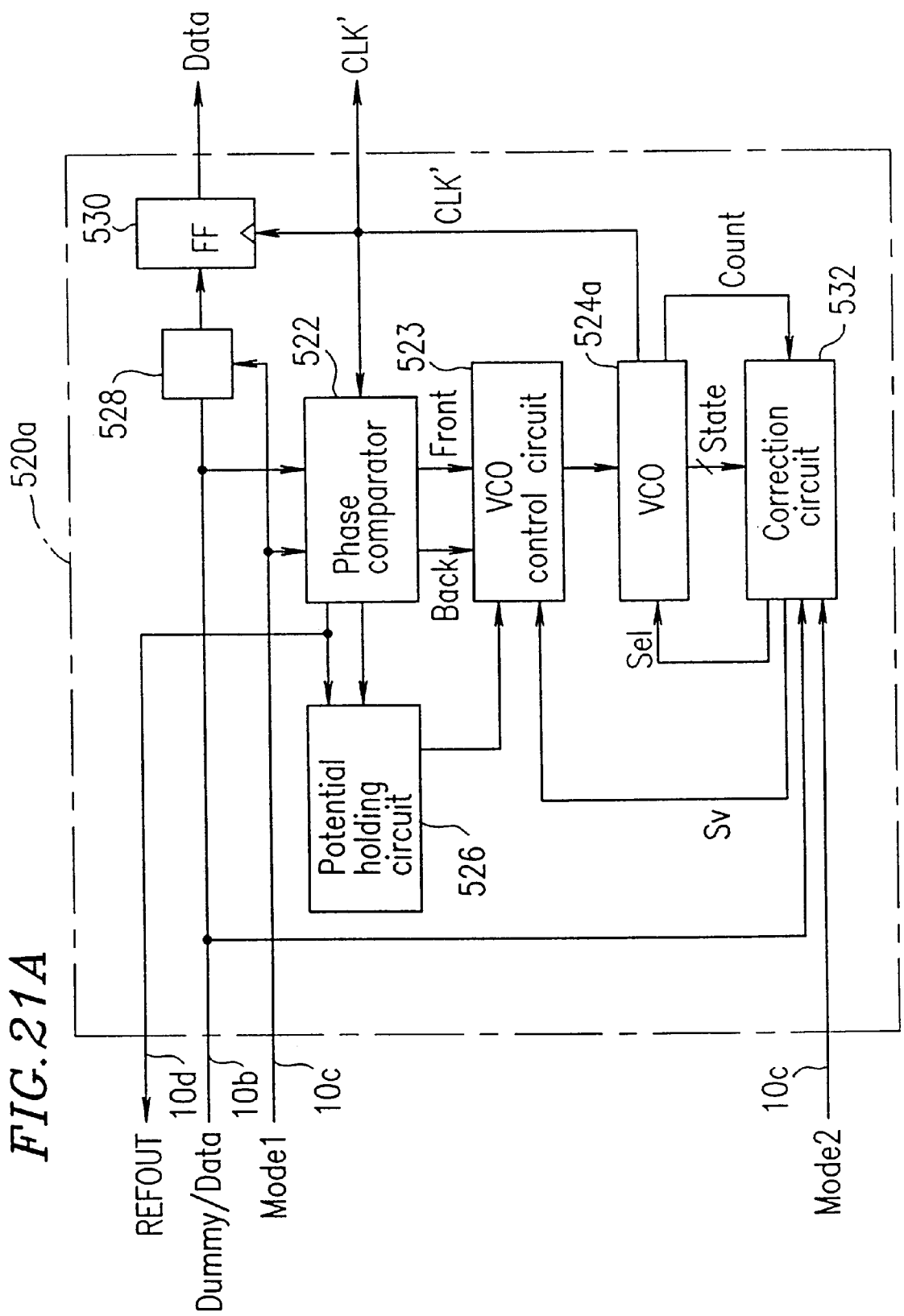

FIG. 21A is a block diagram Illustrating an exemplary structure of a PD reduction circuit 520a for performing a correction process. The PD reduction circuit 520a is obtained by replacing the VCO 524 in the PD reduction circuit 520 (FIG. 17) with a VCO 524a, and further adding a correction circuit 532 for performing a correction process. in FIG. 21A, constituent elements which also appear in FIG. 17 are denoted by the same reference numerals as used therein, and the descriptions thereof are omitted.

Figure 21B:
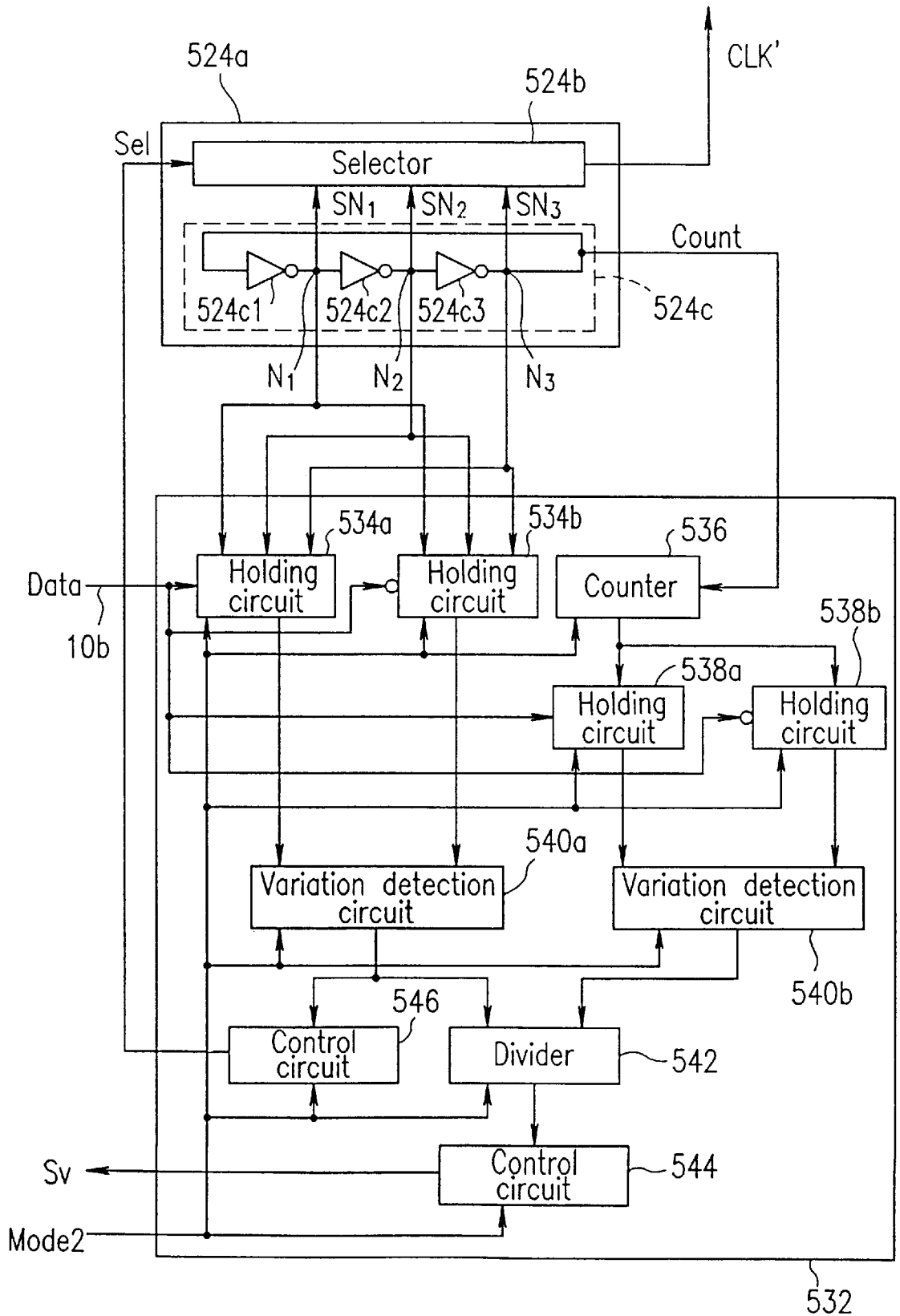
FIG. 21B is a block diagram illustrating exemplary structures of a VCO 524a and a correction circuit 532.

FIG. 21B illustrates exemplary structures of a VCO 524a and a correction circuit 532.

The VCO 524a includes a ring oscillator 524c (including n invertors which are coupled to one another in a ring), and a selector 524b for selecting a signal which is output from a $k^{th}$ invertor among the n invertors, where n is an integer equal to or greater than 2; and k is an integer such that $1 \leq k \leq n$. For conciseness, it is assumed hereinafter that the ring oscillator 524 includes three invertors (i.e., n=3).

The ring oscillator 524c includes an invertor 524c1, an invertor 524c2, and an inverter 524c3, which are coupled to one another in a ring Nodes $N_1$, $N_2$, and $N_3$ are coupled to the outputs of the invertor 524c1, 524c2, and 524c3, respectively.

The state of the ring oscillator 524c is expressed by a combination of the voltage level of the node $N_1$, the voltage level of the node $N_2$, and the voltage level of the node $N_3$. The ring oscillator 524c has States 1 to 6 expressed as follows:

State 1: (H, L, H)
State 2: (L, L, H)
State 3: (L, H, H)
State 4: (L, H, L)
State 5: (H, H, L)
State 6: (H, L, L)

The ring oscillator 524c transits through States 1 to 6 in this order, and returns to State 1 after State 6.

Herein, an expression (x, y, z) refers to a state where the node $N_1$ takes a voltage level of x; the node $N_2$ takes a voltage level of y; and the node $N_3$ takes a voltage level of z.

The voltage level of each of the nodes $N_1$, $N_2$, and $N_3$ alternates between the H level and the L level. Therefore, a signal $SN_1$ output from the node $N_1$, a signal $SN_2$ output from the node $N_2$, and a signal $SN_3$ output from the node $N_3$ can become clock signals vibrating at predetermined periods.

The selector 524b selects one of the signal $SN_1$, a signal $SN_2$, and a signal $SN_3$ in accordance with a selection signal Sel. The signal selected by the selector 524b is output from a VCO 524a as the clock signal CLK'.

The correction circuit 532 includes: holding circuits 534a and 534b for holding the state of the ring oscillator 524c; a counter 536 for counting how many rounds of six states the ring oscillator 524c has gone through; holding circuits 538a and 538b for holding the count value of the counter 536; a variation detection circuit 540a for detecting a variation between a state which is held in the holding circuit 534a and a state which is held in the holding circuit 534b; a variation detection circuit 540b for detecting a variation between a count value which is held in the holding circuit 538a and a count value which is held in the holding circuit 538b; a division circuit 542 for dividing the variation detected by the variation detection circuit 540a by the variation detected by the variation detection circuit 540b to derive a quotient; a control circuit 544 for generating a control signal $S_v$ based on the quotient; and a control circuit 546 for generating the selection signal Sel in accordance with the variation detected by the variation detection circuit 540a.

Each of the holding circuits 534a and 534b, the counter 536, the holding circuits 538a and 538b, the variation detection circuits 540a and 540b, the division circuit 542, and the control circuits 544 and 546 is activated by a control signal Mode 2.

Hereinafter, the operation of the correction circuit 532 will be described.

The current state of the ring oscillator 524c is held in one of the holding circuits 534a and 534b in response to a transition in the level of the data signal Data. An immediately preceding state of the ring oscillator 524c is held in the other of the holding circuits 534a and 534b.

The variation detection circuit 540a detects the variation between the current state of the ring oscillator 524c and an immediately preceding state of the ring oscillator 524c. For example, if the current state of the ring oscillator 524c is "State 3" and the immediately preceding state of the ring oscillator 524c is "State 1", the variation is 2 (=3−1). The variation detection circuit 540a outputs a signal indicating the variation (whose value is 2 in this example) to the division circuit 542.

The counter 536 counts how many rounds of six states the ring oscillator 524c has gone through. Specifically, the counter 536 increments the count value by 1 every time the state of the ring oscillator 524c has changed through States 1 to 6 and back to State 1.

In response to the transition in the level of the data signal Data, the current count value of the counter 536 is held in one of the holding circuits 538a and 538b in response to a transition in the level of the data signal Data. An immediately preceding count value of the counter 536 is held in the other of the holding circuits 538a and 538b.

The variation detection circuit 540b detects the variation between the current count value of the counter 536 and an immediately preceding count value of the counter 536. The variation indicates the number of rounds of six states the ring oscillator 524c has gone through between a transition in the level of the data signal Data and a next transition in the level of the data signal Data. For example, if the count value of the counter 536 is "5" and the immediately preceding count value of the counter 536 is "2", the variation is 3 (=5−2). The variation detection circuit 540b outputs a signal indicating the variation (whose value is 3 in this example) to the division circuit 542.

The division circuit 542 divides the variation detected by the variation detection circuit 540a by the variation detected by the variation detection circuit 540b. The quotient represents a phase shift which has occurred to the data signal Data during one round of six states of the ring oscillator 524c, where the phase shift is expressed in terms of the number of states of the ring oscillator 524c. For example, the quotient obtained in the above-mentioned case is ⅔ (=2÷3), indicative that the data signal Data has been delayed by an amount corresponding to ⅔ states of the ring oscillator 524c during one round of six states of the ring oscillator 524c.

The control circuit 544 generates the control signal $S_v$ in accordance with the quotient. The control signal $S_v$ is supplied to the VCO control circuit 523. As a result, the oscillation frequency of the VCO 524a is adjusted in accordance with the quotient. For example, if the quotient is ⅔, the control circuit 544 generates the control signal $S_v$ so as to increase the cycle of the clock signal CLK' by a length corresponding to ⅔ states of the ring oscillator 524c.

The control circuit 546 changes the value of the selection signal Sel in accordance with the variation detected by the variation detection circuit 540a. For example, if the variation detected by the variation detection circuit 540a is 2, this indicates that the data signal Data has been delayed by an amount corresponding to two states of the ring oscillator 524c between a previous transition in the level of the data signal Data and a current transition in the level of the data signal Data. In this case, the control circuit 546 changes the value of the selection signal Sel so that a signal will be output from a node located two nodes posterior to the node from which a signal is being output.

Thus, the correction circuit 532 calculates the amount of delay which has occurred to the data signal Data between a previous transition in the level of the data signal Data and a current transition in the level of the data signal Data, and the VCO 524a delays the clock signal CLK' by the calculated delay amount. The correction circuit 532 calculates the amount of delay which occurs to the data signal Data for every round of six states of the ring oscillator 524c, and the VCO 524a generates the clock signal CLK' so as to have a frequency which is decreased by the calculated delay amount. AS a result, the phase of the clock signal CLK' is adjusted so that an edge of the data signal Data coincides with an edge of the clock signal CLK'.

Figure 22A:
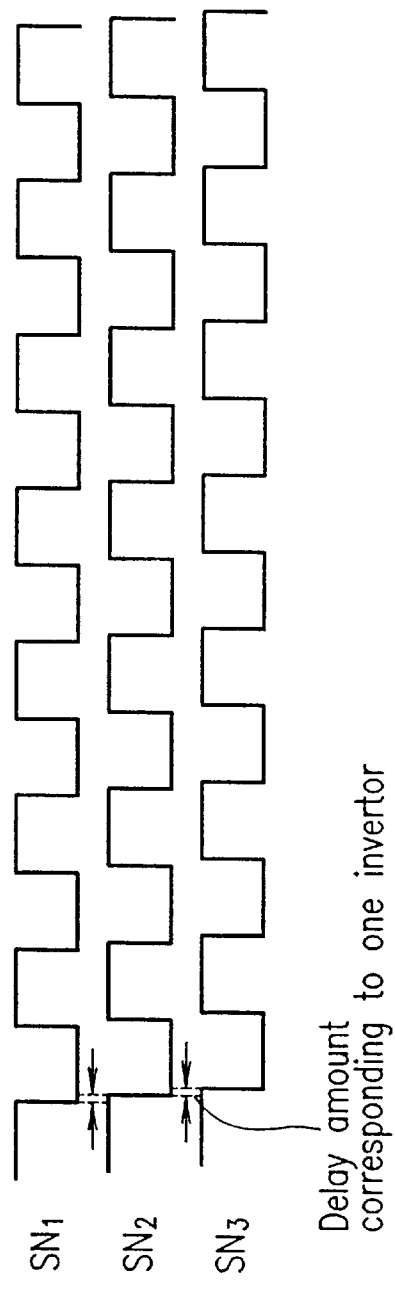
FIG. 22A is a timing diagram illustrating the waveform of a signal which is output from a $k^{th}$ delay circuit among a number (n) of delay circuits included in a ring oscillator 524c.

FIG. 22A shows the waveforms of the signal $SN_1$, the signal $SN_2$, and the signal $SN_3$ respectively output from the nodes $N_1$, $N_2$, and $N_3$ of the ring oscillator 524c. As shown in FIG. 22A, the phase of the signal $SN_2$ is lagging behind that of th signal $SN_1$ by a delay amount corresponding to one invertor, and the phase of the signal $SN_3$ is lagging behind that of th signal $SN_2$ by a delay amount corresponding to one invertor.

Figure 22B:
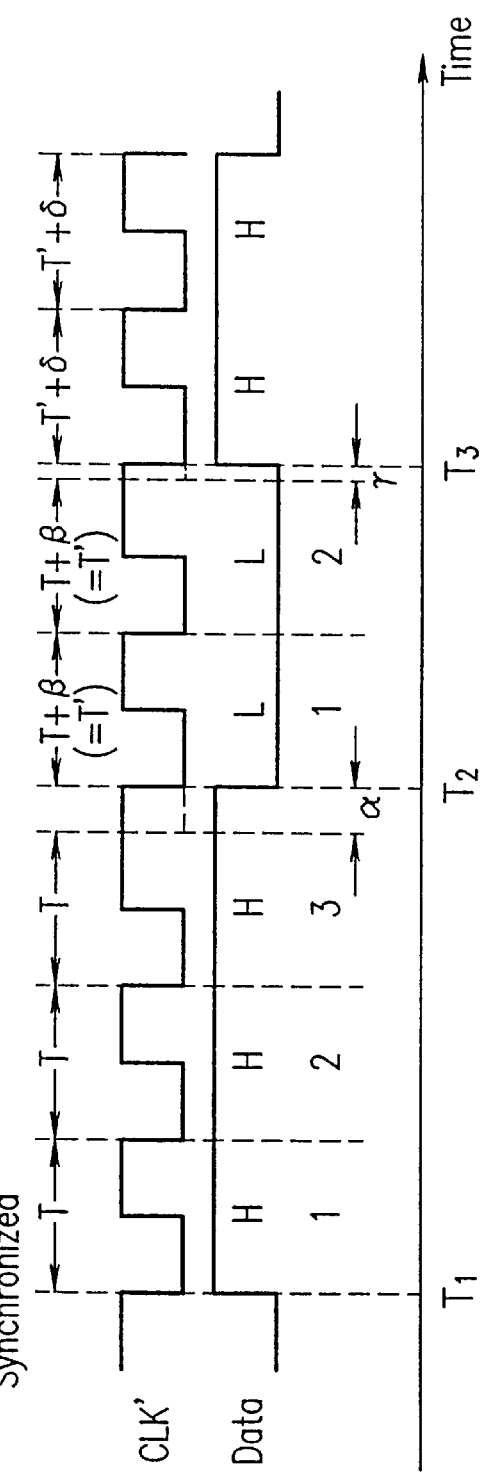
FIG. 22B is a timing diagram illustrating the case where the cycle of a clock signal CLK' is shorter than the cycle of a data signal Data.
Figure 23A:
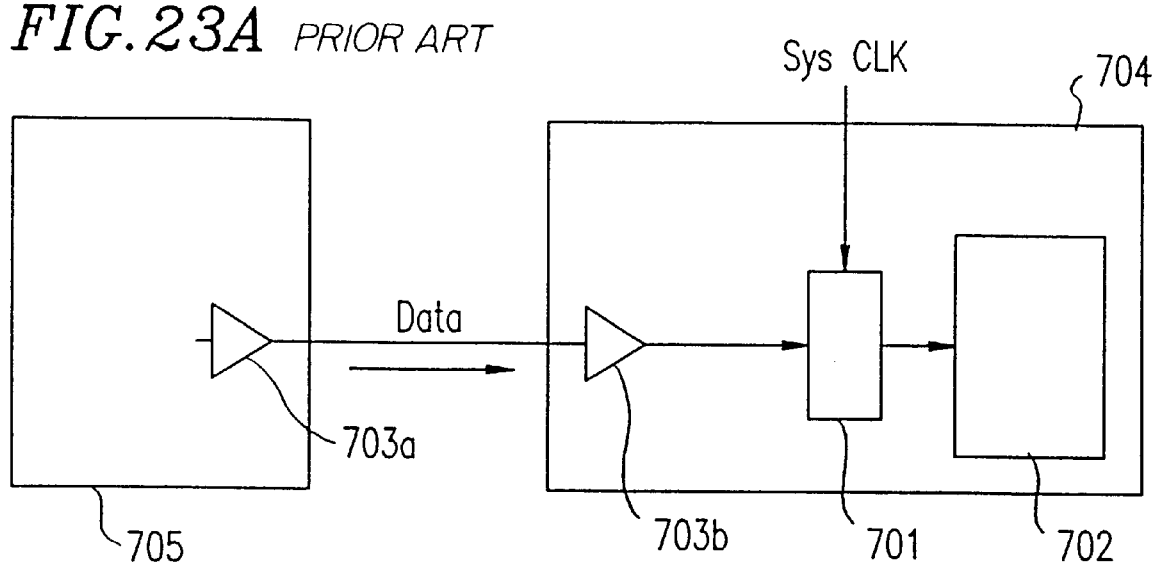
FIG. 23A is a block diagram illustrating an exemplary structure of a conventional synchronization system.
Figure 23B:
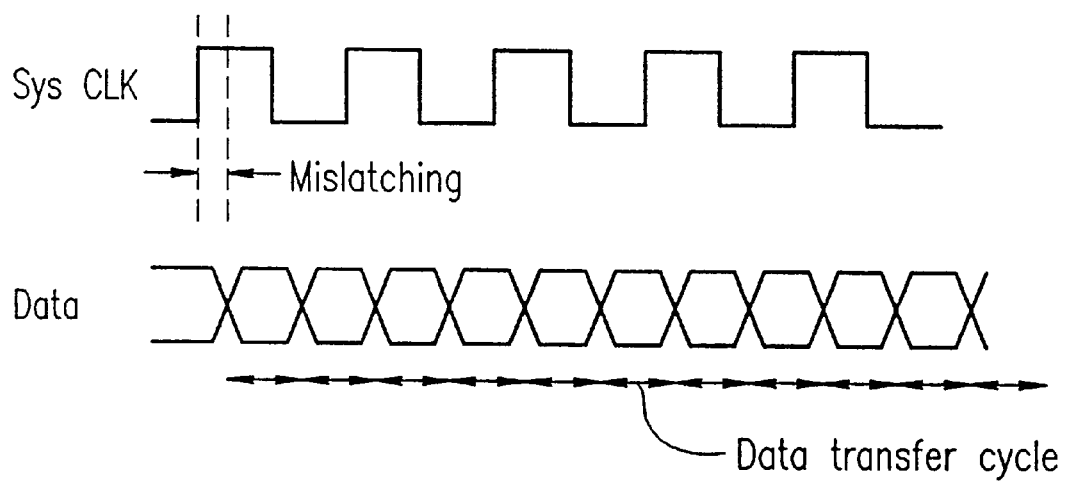
FIG. 23B is a timing diagram illustrating a phase shift.
Figure 24A:
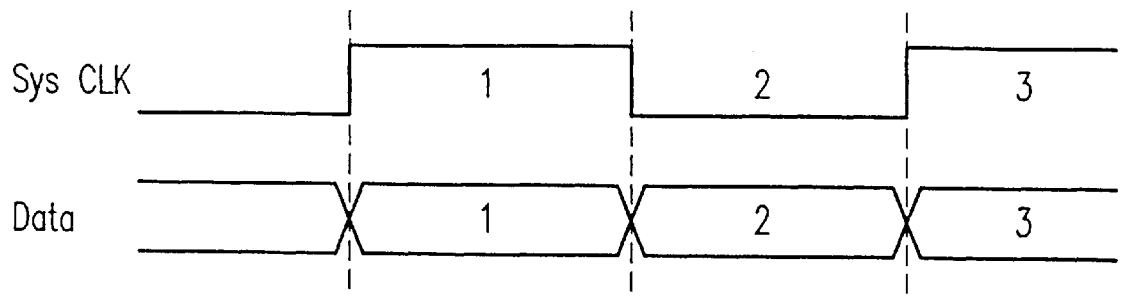
FIG. 24A is a timing diagram illustrating the case where a reference clock signal SysCLK and a data signal completely match in phase.
Figure 24B:
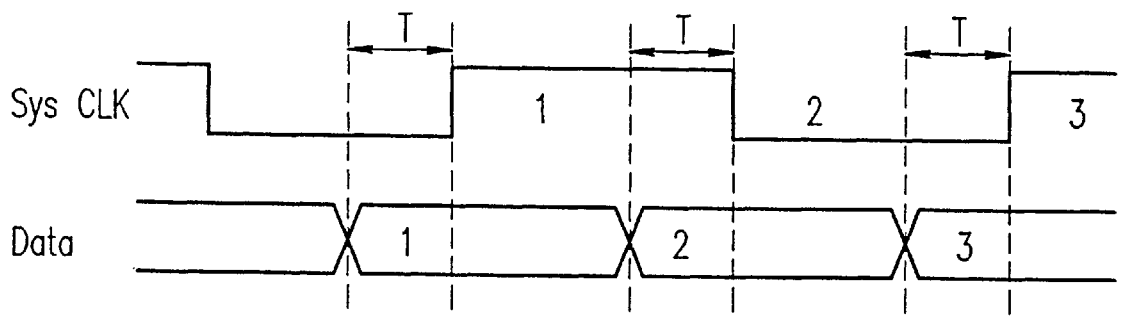
FIG. 24B is a timing diagram illustrating the case where the reference clock signal SysCLK and the date signal have a phase shift T.
Figure 24C:
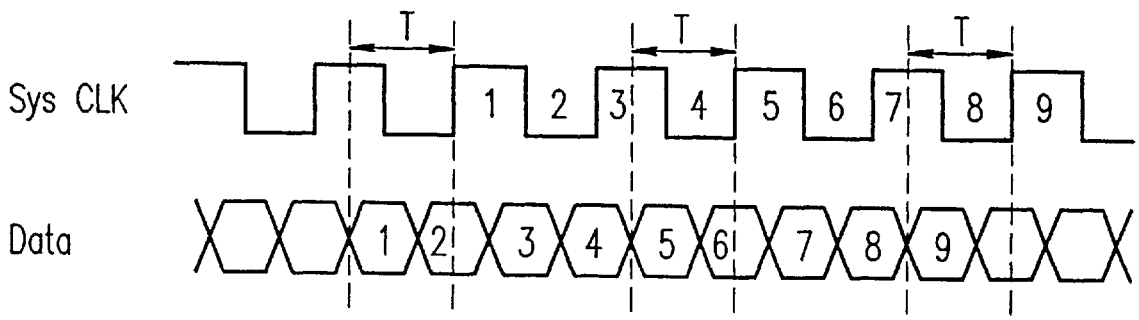
FIG. 24C is a timing diagram illustrating the case where a reference clock signal SysCLK and a data signal have a phase shift T in the case where the reference clock signal SysCLK has a high frequency.

FIG. 22B illustrates an example correction process performed by the correction circuit 532.

In the example illustrated in FIG. 22B, it is assumed that the data signal Data goes from the L level to the H level at time $T_1$, and goes from the H level to the L level at time $T_2$. It is further assumed that the data signal Data is delayed by an amount corresponding to two states of the ring oscillator 524c during a period between time $T_1$ and time $T_2$, and that the ring oscillator 524c makes three rounds of six states during the period between time $T_1$ and time $T_2$.

In this case, the clock signal CLK' is delayed by a delay amount $\alpha$ through the above-described correction process. The delay amount $\alpha$ is an amount corresponding to two states of the ring oscillator 524c. As a result, an edge of the data signal Data and an edge of the clock signal CLK' coincide at time $T_2$. Moreover, the above-described correction process adjusts the cycle of the clock signal CLK' so as to be (T+β) at time $T_2$ and later. Herein, T represents the cycle of the clock signal CLK' during the period between time $T_1$ and time $T_2$; and β represents a length corresponding to ⅔ states of the ring oscillator 524c.

It is further assumed in the example illustrated in FIG. 22B that the data signal Data goes from the L level to the H level at time $T_3$. Moreover, it is assumed that the data signal Data is delayed by an amount corresponding to one state of the ring oscillator 524c during a period between time $T_2$ and time $T_3$, and that the ring oscillator 524c makes two rounds of six states during the period between time $T_2$ and time $T_3$.

In this case, the clock signal CLK' is delayed by a delay amount γ through the above-described correction process. The delay amount γ is an amount corresponding to one state of the ring oscillator 524c. As a result, an edge of the data signal Data and an edge of the clock signal CLK' coincide at time $T_3$. Moreover, the above-described correction process adjusts the cycle of the clock signal CLK' so as to be (T'+δ) at time $T_3$ and later. Herein, T' represents the cycle of the clock signal CLK' during the period between time $T_2$ and time $T_3$; and δ represents a length corresponding to ½ states of the ring oscillator 524c.

As described above, according to the present invention, a semiconductor integrated circuit, a system, and a method for preventing a skew from occurring even in the case where a clock signal and a data signal are transferred via different paths.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A semiconductor integrated circuit comprising:
   a phase difference reduction circuit for reducing a first phase difference between a clock signal and a data signal; and
   a circuit for receiving the data signal with a reduced first phase difference between the clock signal and the data signal,
   wherein the phase difference reduction circuit includes:
   a delay amount determination circuit for determining a first delay amount for reducing a second phase difference between the clock signal and a dummy pattern signal during a first period and for determining a second delay amount for reducing the first phase difference between the clock signal and the data signal during a second period, the first period and second period performed in alternating subsequent steps, wherein determination of the first delay amount for reducing a second phase difference between the clock signal and a dummy pattern signal during a subsequent first period is not performed when reduction of the first phase difference between the clock signal and the data signal is performed during a preceding second period; and a variable delay circuit for delaying one of the clock signal and the dummy pattern signal in accordance with the first delay amount during the first period, and for delaying one of the clock signal and the data signal in accordance with the second delay amount during the second period.

2. A semiconductor integrated circuit according to claim 1, wherein the dummy pattern signal is a signal which undergoes at least one transition from a first logic level to a second logic level during the first period.

3. A semiconductor integrated circuit according to claim 1, wherein the data signal is input to the phase difference reduction circuit via a data line, and the dummy pattern signal is input to the phase difference reduction circuit via the data line before the data signal is input to the phase difference reduction circuit.

4. A system comprising a first semiconductor integrated circuit and a second semiconductor integrated circuit, wherein the first semiconductor integrated circuit comprises an output circuit for outputting a data signal to the second semiconductor integrated circuit, the second semiconductor integrated circuit comprises:

a phase difference reduction circuit for receiving the data signal output from the first semiconductor integrated circuit and reducing a first phase difference between a clock signal and the data signal; and a circuit for receiving the data signal with a reduced first phase difference between the clock signal and the data signal, and the phase difference reduction circuit includes:

a delay amount determination circuit for determining a first delay amount for reducing a second phase difference between the clock signal and a dummy pattern signal during a first period and for determining a second delay amount for reducing the first phase difference between the clock signal and the data signal during a second period, the first period and second period performed in alternating subsequent steps, wherein determination of the first delay amount for reducing a second phase difference between the clock signal and a dummy pattern signal during a subsequent first period is not performed when reduction of the first phase difference between the first period is not performed when reduction of the first phase difference between the clock signal and the data signal is performed during a preceding second period; and a variable delay circuit for delaying one of the clock signal and the dummy pattern signal in accordance with the first delay amount during the first period and for delaying one of the clock signal and the data signal in accordance with the second delay amount during the second period.

5. A system according to claim 4, wherein the dummy pattern signal is a signal which undergoes at least one transition from a first logic level to a second logic level during the first period.

6. A system according to claim 4, wherein the first semiconductor integrated circuit and the second semiconductor integrated circuit are interconnected via a date line, and the data signal is transferred from the first semiconductor integrated circuit to the second semiconductor integrated circuit via the data line, the dummy pattern signal being transferred from the first semiconductor integrated circuit to the second semiconductor integrated circuit via the data line before the date signal is transferred from the first semiconductor integrated circuit to the second semiconductor integrated circuit.

7. A method for reducing a skew between a clock signal and a data signal comprising the steps of:

(a) reducing a first phase difference between the clock signal and a data signal; and (b) receiving the data signal with a reduced first phase difference between the clock signal and the data signal, wherein the step of reducing the first phase difference includes:

determining a first delay amount for reducing a second phase difference between the clock signal and a dummy pattern signal during a first period and determining a second delay amount for reducing the first phase difference between the clock signal and the data signal during a second period, the first period and second period being performed in alternating subsequent steps, wherein determination of the first delay amount for reducing a second phase difference between the clock signal and a dummy pattern signal during a subsequent first period is not performed when reduction of the first phase difference between the clock signal and the data signal is performed during a preceding second period; and delaying one of the clock signal and the dummy pattern signal in accordance with the first delay amount during the first period, and for delaying one of the clock signal and the data signal in accordance with the second delay amount during the second period.

8. A method according to claim 7, wherein the dummy pattern signal is a signal which undergoes at least one transition from a first logic level to a second logic level during the first period.

9. A method for reducing a skew between a clock signal and a data signal in a semiconductor integrated circuit coupled to a data line, the method comprising the steps of:

(a) receiving a dummy pattern signal via the data line during a first period;

(b) receiving the data signal via the data line during a second period;

(c) reducing a first phase difference between the clock signal and the data signal based on a second phase difference between the clock signal and the dummy pattern signal, wherein the step of reducing the first phase difference includes:

determining a first delay amount for reducing the second phase difference between the clock signal and a dummy pattern signal during a first period and determining a second delay amount for reducing the first phase difference between the clock signal and the data signal during a second period, the first period and second period being performed in alternating subsequent steps, wherein determination of the first delay amount for reducing a second phase difference between the clock signal and a dummy pattern signal during a subsequent first period is not performed when reduction of the first phase difference between the clock signal and the data signal is performed during a preceding second period; and delaying one of the clock signal and the dummy pattern signal in accordance with the first delay amount during the first period and for delaying one of the clock signal and the data signal in accordance with the second delay amount during the second period.

* * * * *